United States Patent
Yatsuzuka et al.

(10) Patent No.: US 7,879,440 B2
(45) Date of Patent: Feb. 1, 2011

(54) MATTE FILM

(75) Inventors: Michihiro Yatsuzuka, Suzuka (JP); Masayuki Sukigara, Suzuka (JP); Mitsuyoshi Itada, Suzuka (JP)

(73) Assignee: Asahi Kasei Life & Living Corporation, Tokyo (JP)

( * ) Notice: Subject to any disclaimer, the term of this patent is extended or adjusted under 35 U.S.C. 154(b) by 972 days.

(21) Appl. No.: 10/580,266

(22) PCT Filed: Nov. 24, 2004

(86) PCT No.: PCT/JP2004/017410
§ 371 (c)(1), (2), (4) Date: Jan. 24, 2007

(87) PCT Pub. No.: WO2005/052056
PCT Pub. Date: Jun. 9, 2005

(65) Prior Publication Data
US 2007/0160782 A1 Jul. 12, 2007

(30) Foreign Application Priority Data

| Nov. 25, 2003 | (JP) | ............................. 2003-394285 |
| Mar. 17, 2004 | (JP) | ............................. 2004-076797 |
| Mar. 17, 2004 | (JP) | ............................. 2004-076981 |
| Mar. 17, 2004 | (JP) | ............................. 2004-076982 |
| Apr. 9, 2004 | (JP) | ............................. 2004-115212 |

(51) Int. Cl.
*B32B 27/06* (2006.01)
*B32B 27/18* (2006.01)
*B32B 27/36* (2006.01)
*C08G 63/08* (2006.01)
*C08L 3/04* (2006.01)

(52) U.S. Cl. ........................ 428/327; 428/323; 428/397; 428/401; 428/480; 428/532; 524/47; 524/50; 524/51; 525/415; 528/354; 528/361; 106/162.1

(58) Field of Classification Search ........................ None
See application file for complete search history.

(56) References Cited

U.S. PATENT DOCUMENTS

| 4,871,506 | A | * | 10/1989 | Moulies et al. | ............. 264/514 |
| 5,444,107 | A | * | 8/1995 | Ajioka et al. | ............. 523/124 |
| 5,462,983 | A | * | 10/1995 | Bloembergen et al. | ........ 524/51 |
| 5,693,786 | A | * | 12/1997 | Tanaka et al. | ............. 536/107 |
| 5,844,023 | A | * | 12/1998 | Tomka | ........................ 524/47 |
| 5,939,467 | A | * | 8/1999 | Wnuk et al. | ................. 523/128 |
| 6,011,092 | A | * | 1/2000 | Seppala et al. | ................. 524/47 |
| 6,096,809 | A | * | 8/2000 | Lorcks et al. | ................. 524/47 |

(Continued)

FOREIGN PATENT DOCUMENTS

| DE | 29710825 | * | 1/1998 |
| JP | 8-502552 | | 3/1996 |
| JP | 2742892 | | 2/1998 |
| JP | 2939586 | | 6/1999 |

(Continued)

OTHER PUBLICATIONS

Supplementary European Search Report, mailed Dec. 3, 2007 and issued in corresponding European Patent Application No. 04819368.4-2102.

*Primary Examiner*—Vivian Chen
(74) *Attorney, Agent, or Firm*—Staas & Halsey LLP

(57) ABSTRACT

A polylactic acid resin film or sheet which can be satisfactorily and stably formed and has excellent matte properties. It is a single-layer matte film or sheet which comprises a polylactic acid resin composition containing a particulate substance and at least one side of which has a surface gloss as measured in accordance with ASTM-D2457-70 (45° gloss) of 60% or lower.

6 Claims, 8 Drawing Sheets

U.S. PATENT DOCUMENTS

| | | | |
|---|---|---|---|
| 6,117,925 A * | 9/2000 | Tomka | 524/47 |
| 6,183,814 B1 * | 2/2001 | Nangeroni et al. | 427/361 |
| 6,231,970 B1 * | 5/2001 | Andersen et al. | 428/332 |
| 6,235,815 B1 * | 5/2001 | Loercks et al. | 524/47 |
| 6,472,497 B2 * | 10/2002 | Loercks et al. | 528/196 |
| 6,495,679 B1 * | 12/2002 | Tanaka | 536/107 |
| 6,573,340 B1 * | 6/2003 | Khemani et al. | 525/437 |
| 6,627,752 B1 * | 9/2003 | Billmers et al. | 536/110 |
| 6,669,771 B2 * | 12/2003 | Tokiwa et al. | 106/162.7 |
| 6,808,780 B2 * | 10/2004 | Laney et al. | 428/64.1 |
| 7,175,917 B2 * | 2/2007 | Sukigara et al. | 428/480 |
| 7,176,251 B1 * | 2/2007 | Bastioli et al. | 524/47 |
| 7,241,832 B2 * | 7/2007 | Khemani et al. | 524/537 |
| 7,268,190 B2 * | 9/2007 | Ohme et al. | 525/400 |
| 7,615,183 B2 * | 11/2009 | Tweed et al. | 264/563 |
| 2003/0021821 A1 | 1/2003 | Fertala et al. | |
| 2004/0068059 A1 * | 4/2004 | Katayama et al. | 525/466 |
| 2005/0182201 A1 | 8/2005 | Matsumoto et al. | |
| 2008/0044650 A1 * | 2/2008 | Sukigara et al. | 428/338 |

FOREIGN PATENT DOCUMENTS

| | | | |
|---|---|---|---|
| JP | 3008071 | | 12/1999 |
| JP | 3055001 | | 4/2000 |
| JP | 3138196 | | 12/2000 |
| JP | 2001-49003 | | 2/2001 |
| JP | 3154056 | | 2/2001 |
| JP | 3172559 | | 3/2001 |
| JP | 3175306 | | 4/2001 |
| JP | 2002-011778 | | 1/2002 |
| JP | 2002-200724 | | 7/2002 |
| JP | 2003-73539 | | 3/2003 |
| JP | 2003-105182 | | 4/2003 |
| JP | 2003-183419 | | 7/2003 |
| JP | 2003-231216 | * | 8/2003 |
| JP | 2004-149636 | | 5/2004 |
| WO | WO 02/00149 | | 1/2002 |
| WO | WO 02/46277 | | 6/2002 |
| WO | 2004/000939 A1 | | 12/2003 |
| WO | WO 2005/052655 | | 6/2005 |

* cited by examiner

500nm

500nm

500nm

MATTE FILM

This application is based on and hereby claims priority to PCT Application No. PCT/JP2004/017410 filed on Nov. 24, 2004 and Japanese Application Nos. 2003-394285, 2004-076982, 2004-076981, 2004-076797, and 2004-115212 filed on Nov. 25, 2003, Mar. 17, 2004, Mar. 17, 2004, Mar. 17, 2004, and Apr. 9, 2004 respectively, the contents of which are hereby incorporated by reference.

TECHNICAL FIELD

The present invention relates to a polylactic acid resin film or sheet which has adequate film-forming stability and has excellent matte properties. Furthermore, the present invention relates to a matte type heat-shrinkable or heat-unshrinkable film or sheet; and a packaging material, an agricultural material such as a cultivation house and a mulch film, a wall paper, a screen, an interior decoration, a commodity, a school supply such as an envelope, a file case and a cover workpiece, a stationery, a notebook, and a paper product, a paper container, a fabric product and a textile product having high-quality and modest appearance with controlled gloss, which are obtained by layering the film or sheet with another material.

BACKGROUND ART

In general, an oriented film which uses a resin material such as polyethylene terephthalate, polypropylene and polyethylene, and is transparent and glossy has been widely used as a wrapping material. On the other hand, a matte film or sheet with controlled gloss, which has been conventionally used for a wall paper, a screen, an envelope, various files for a stationery, and the like, which dislike stray light, is supposed to be effective in enhancing an appeal and buying inclinations of a product in the packaging industry, and is demanded.

In relation to a matte film or sheet, for instance, Patent Document 1 (Japanese Patent No. 3172559) discloses a matte film for wall paper which is formed of an ethylene-vinyl alcohol copolymer containing 1 wt % or more of an inorganic filler, and has a gloss of 60% or less; Patent Document 2 (JP-A-2002-200724) discloses a matte biaxially-oriented polyester packaging film which includes 1 wt % or more of inactive particles such as organic or inorganic particles with a particular particle size, and has a gloss of 35% or less and an optical haze of 80% or less; and Patent Document 3 (Japanese Patent No. 3175306) discloses an annealed matte polypropylene film having a gloss of 30% or less and an optical haze of 18% or less.

However, when these resin materials are disposed, such a resin material as to have a low combustion heat quantity, be decomposed in soil and be safe has been expected from the viewpoint of environmental protection. A product using a biodegradable resin of aliphatic polyester such as a polylactic acid resin, specifically, a vessel such as a film/sheet and a bottle, a formed material, fiber, a nonwoven fabric, a foam and a composite material using them have been actively studied. However, the biodegradable film or sheet has not yet been obtained which is made from a polylactic acid resin and has excellent matte properties.

A polylactic acid resin is a polycondensate of lactic acid with an optically-active center, and has an optical purity (OP: in unit of %) calculated through the following equation on the basis of a composition ratio of monomer units of L-lactic acid and/or D-lactic acid constituting the polymer.

OP=|[L]−[D]|, wherein [L]+[D]=100, (wherein [L] represents wt % for L-lactic acid constituting the polylactic acid resin; [D] represents wt % for D-lactic acid constituting the polylactic acid resin; and | | represents an absolute value of a calculated value).

The polylactic acid resin has such a property that the resin with a high optical purity of 80% or higher becomes crystalline and the resin with a low optical purity of lower than 80% becomes amorphous; has a lower optical haze (in accordance with ASTM-D1003-95) and more adequate transparency than the other biodegradable resins; has such excellent transparency, glossiness and rigidity as a gloss of 130% or more (in accordance with ASTM-D2457-70: at 45 degrees) and a tensile elasticity of about 2 to 5 GPa (in accordance with ASTM-D882-95a); but is brittle at room temperature (23° C.) and is inferior in matte properties, because of having the glass transition temperature Tg of about 60° C. which is especially higher than that of other biodegradable resins.

A polylactic acid resin has a defect of being inferior in impact resistance which is required when a packet is transported, because of having brittleness originally, so that an attempt has been conventionally made for the purpose of improving the impact resistance by mixing a biodegradable polyester which is superior in the impact resistance and has a low glass transition temperature Tg (10° C. or lower), with itself, but the attempt of improving matte properties has not been made. The term biodegradable polyester here means a crystalline resin which includes an aliphatic polyester obtained by polycondensing the main components containing aliphatic dicarboxylic acid and aliphatic diol, an aliphatic polyester obtained by ring-opening polymerizing cyclic lactone, a synthesized aliphatic polyester, and an aliphatic polyester biosynthesized in a bacterial cell; has a crystalline melting point in a range of 60 to 170° C. and a glass transition temperature of room temperature (23° C.) or lower; and is rubbery and has impact resistance at room temperature; but is inferior in transparency to that of the polylactic acid resin.

An oriented polylactic acid film or sheet made from a mixture mainly consisting of a polylactic acid resin and a biodegradable polyester with a glass transition temperature Tg of 0° C. or lower is disclosed in, for instance, Patent Document 4 (Japanese Patent No. 3138196) and the like, but any of them cannot be said to reach a practical level of matte properties, though having improved the impact resistance, and has a problem.

As for an oriented polylactic acid film or sheet mainly consisting of a mixture of a polylactic acid resin and inactive particles, Patent Document 5 (JP-A-2001-49003) discloses a method for obtaining the oriented polylactic acid film which contains 20 wt % of calcium carbonate having an average particle size of 0.6 μm, or 15 wt % of a polystyrene resin and 5 wt % of titanium oxide (in any of which the contents of inactive particles are 20 wt %), and is a white and opaque film. However, the film having excellent matte properties cannot be obtained only by merely adding the inorganic particles and the organic particles to a resin, and Patent Document 5 does not disclose the method of improving matte properties. Specifically, the film or sheet having adequate matte properties has not been obtained with the use of the polylactic acid resin.

Patent Document 6: (JP-A-8-502552), Patent Document 7 (Japanese Patent No. 2742892), Patent Document 8 (Japanese Patent No. 3008071), Patent Document 9 (Japanese Patent No. 3055001), Patent Document 10 (Japanese Patent No. 3154056) and Patent Document 11 (Japanese Patent No. 2939586) disclose a biodegradable film made from a chemically-modified-starch-based biodegradable resin which is a mixture consisting of mainly (50 wt % or more) at least one starch derivative selected from the group consisting of starch ester, starch ether and polyester graft polymer starch and a biodegradable polyester containing a polylactic acid resin, though they do not specifically disclose an oriented film made from a polylactic acid resin containing mainly (75 wt % or more) the polylactic acid resin. These documents disclose the film which is mainly made from the starch derivative having adequate compatibility with a biodegradable polyester including a polylactic acid polymer and is superior in transparency, but do not disclose the film having achieved adequate matte properties at all.

In addition, generally, when a resin of a main component is blended with a second resin having low compatibility with the main resin, the second resin is ununiformly mixed with the main resin, and the obtained blended substance becomes opaque. A film or sheet formed from the resin in such a blent state occasionally shows matte properties to some extent, but becomes fragile. It is often difficult to stably obtain the film or sheet from such a resin, and particularly to obtain a thin film.

Patent Document 1: Japanese Patent No. 3172559
Patent Document 2: JP-A-2002-200724
Patent Document 3: Japanese Patent No. 3175306
Patent Document 4: Japanese Patent No. 3138196
Patent Document 5: JP-A-2001-49003
Patent Document 6: JP-A-8-502552
Patent Document 7: Japanese Patent No. 2742892
Patent Document 8: Japanese Patent No. 3008071
Patent Document 9: Japanese Patent No. 3055001
Patent Document 10: Japanese Patent No. 3154056
Patent Document 11: Japanese Patent No. 2939586

DISCLOSURE OF THE INVENTION

Problems to be Solved by the Invention

An object of the present invention is to provide a polylactic acid resin film or sheet which has adequate film-forming stability and has excellent matte properties.

Means for Solving the Problems

A polylactic acid resin has a glass transition temperature Tg of about 60° C., and is a hard resin in a glass state at atmospheric temperature, so that it has been difficult in the prior art to form a film or sheet having excellent matte properties, because when the polylactic acid resin in its original condition is formed into a film or a sheet, the film or the sheet shows high gloss having a surface gloss (45° gloss) exceeding 100%.

The present inventors have conducted extensive studies for solving the above described problems, and as a result, have found that a polylactic acid resin film or sheet, which has an adequate film-forming stability and excellent matte properties, is obtained by forming the film or the sheet from a polylactic acid resin composition including a particulate substance so as to acquire a particular surface gloss. This finding has led to the completion of the present invention.

First, it has been difficult in the prior art to simultaneously give both of adequate matte properties free from blotches and film-forming stability to a film or a sheet to be formed, by mixing a polylactic acid resin with a chemically modified starch and a plasticizer at a particular ratio, and besides, uniformly dispersing the chemically modified starch having low dispersibility into the polylactic acid resin. As a result of extensive studies for solving the above described problem, the present inventors have found that a film or a sheet having adequate film-forming stability and matte properties is produced by making a mixture of the polylactic acid resin (A), the chemically modified starch (B) and the plasticizer (C) into the particular ratio of them. This finding has led to the completion of the present invention.

Second, it has been difficult in the prior art to simultaneously give both of adequate matte properties free from blotches and film-forming stability to a film or a sheet to be formed, by mixing a polylactic acid resin with starch and a plasticizer, which have biodegradability, at a particular ratio, and besides, uniformly dispersing the starch having low dispersibility into the polylactic acid resin. As a result of extensive studies for solving the above described problem, the present inventors have found that a film or a sheet having the adequate film-forming stability and adequate matte properties is produced by making a mixture of the polylactic acid resin (A), the starch (E) and the plasticizer (C) into the particular ratio of them. This finding has led to the completion of the present invention.

Third, it has been difficult in the prior art to simultaneously give both of adequate matte properties free from blotches and film-forming stability to a film or a sheet to be formed, by mixing a polylactic acid resin with a particulate polymer at a particular ratio, and besides, uniformly dispersing the particulate polymer having low dispersibility and easily causing secondary agglomeration into the polylactic acid resin. As a result of extensive studies for solving the above described problem, the present inventors have found that a film or a sheet having the adequate film-forming stability and the adequate matte properties is produced by making a mixture of the polylactic acid resin (A), the particulate polymer (D) and a plasticizer (C) as needed, into the particular ratio of them. This finding has led to the completion of the present invention.

Fourth, it has been difficult in the prior art to simultaneously give both of adequate matte properties free from blotches and film-forming stability to a film or a sheet to be formed, by mixing a polylactic acid resin with an inorganic filler at a particular ratio, and besides, uniformly dispersing the inorganic filler having low dispersibility into the polylactic acid resin. As a result of extensive studies for solving the above described problem, the present inventors have found that a film or a sheet having the adequate film-forming stability and the adequate matte properties is produced by making a mixture of the polylactic acid resin (A) and the inorganic filler (F) into the particular ratio of them. This finding has led to the completion of the present invention.

Specifically, the present invention will be now described below.

1) A single-layer matte film or sheet comprising a polylactic acid resin composition containing a particulate substance, wherein at least one side of the film or sheet has a surface gloss of 60% or lower when measured in accordance with ASTM-D2457-70 (45° gloss).

2) The single-layer matte film or sheet according to item 1), wherein the particulate substance is a chemically modified starch (B), and the film or sheet comprises a mixture containing 55 to 97 wt % of a polylactic acid resin (A), 2 to 30 wt % of the chemically modified starch (B), and 1 to 15 wt % of a plasticizer (C).

3) The matte film or sheet according to item 2), wherein the chemically modified starch (B) is a starch derivative mixture containing 40 wt % or more of at least one starch derivative (b) selected from the group consisting of starch ester, starch ether, and polyester graft polymer starch.

4) The matte film or sheet according to item 3), wherein the starch derivative (b) has a glass transition temperature Tg of 100 to 170° C.

5) The matte film or sheet according to any one of items 2) to 4), wherein the film or sheet has a micro phase-separation structure in which the polylactic acid resin (A) forms a matrix and the chemically modified starch (B) forms a domain, and in a cross-section cut in the transverse direction of the film or sheet (referred to as TD cross-section), an average of the cross-sectional areas of larger first 20% domains when the cross-sectional areas are count down among all the domains of the chemically modified starch (B) is 20,000 $nm^2$ or larger.

6) The matte film or sheet according to any one of items 2) to 5), wherein the plasticizer (C) is an ester synthesized from a combination of two or more compounds selected from the group consisting of an aliphatic carboxylic acid having 7 or less carbon atoms, an aliphatic hydroxycarboxylic acid having 7 or less carbon atoms, and an aliphatic alcohol having 7 or less carbon atoms.

7) The matte film or sheet according to any one of items 2) to 6), further comprising 5 wt % or less of a particulate polymer (D) having an average particle size of 10 μm or smaller, based on 100 wt % in total of the polylactic acid resin (A), the chemically modified starch (B) and the plasticizer (C).

8) A multilayered matte film or sheet comprising the matte film or sheet according to any one of items 1) to 7) stacked so that the surface having a surface gloss of 60% or less is at least one external surface.

9) The single-layer matte film or sheet according to item 1), wherein the particulate substance is a starch (E), and the film or sheet comprises a mixture containing 45 to 97.5 wt % of a polylactic acid resin (A), 2 to 40 wt % of the starch (E), and 0.5 to 15 wt % of a plasticizer (C).

10) The matte film or sheet according to item 9), wherein the film or sheet has a micro phase-separation structure in which the polylactic acid resin (A) forms a matrix and the starch (E) forms a domain.

11) The matte film or sheet according to any one of items 9) and 10), wherein the plasticizer (C) is a mixed plasticizer containing 10 to 90 wt % of an aliphatic polyhydric alcohol having two or more hydroxyl groups in the molecule and 10 or less carbon atoms.

12) The matte film or sheet according to any one of items 9) to 11), further comprising 5 wt % or less of a particulate polymer (D) having an average particle size of 10 μm or smaller based on 100 wt % in total of the polylactic acid resin (A), the starch (E) and the plasticizer (C).

13) A multilayered matte film or sheet comprising the matte film or sheet according to any one of items 9) to 12) stacked so that the surface having a surface gloss of 60% or less is at least one external surface.

14) The single-layer matte film or sheet according to item 1), wherein the particulate substance is a particulate polymer (D), and the film or sheet comprises a mixture containing 70 to 99 wt % of a polylactic acid resin (A) and 1 to 30 wt % of the particulate polymer (D).

15) The single-layer matte film or sheet according to item 1), wherein the particulate substance is a particulate polymer (D), and the film or sheet comprises a mixture containing 55 to 99 wt % of a polylactic acid resin (A), 1 to 30 wt % of the particulate polymer (D), and 15 wt % or less of a plasticizer (C).

16) The matte film or sheet according to item 14) or 15), wherein the particulate polymer (D) has an average particle size of 10 μm or smaller.

17) The matte film or sheet according to any one of items 14) to 16), wherein the plasticizer (C) is an ester synthesized from a combination of two or more compounds selected from the group consisting of an aliphatic carboxylic acid, an aliphatic hydroxycarboxylic acid, and an aliphatic alcohol.

18) A multilayered matte film or sheet comprising the matte film or sheet according to any one of items 14) to 17) stacked so that the surface having a surface gloss of 60% or less is at least one external surface.

19) The matte film or sheet according to item 1), wherein the particulate substance is an inorganic filler (F), and the film or sheet comprises a mixture containing 70 to 99.5 wt % of a polylactic acid resin (A) and 0.5 to 30 wt % of the inorganic filler (F).

20) The single-layer matte film or sheet according to item 1), wherein the particulate substance is an inorganic filler (F), and the film or sheet comprises a mixture containing 55 to 99.5 wt % of a polylactic acid resin (A), 0.5 to 30 wt % of the inorganic filler (F), and 15 wt % or less of a plasticizer (C).

21) The matte film or sheet according to item 19) or 20), wherein the inorganic filler (F) has an average particle size of 10 μm or smaller.

22) The matte film or sheet according to any one of items 19) to 21), wherein the plasticizer (C) is an ester synthesized from a combination of two or more compounds selected from the group consisting of an aliphatic carboxylic acid, an aliphatic hydroxycarboxylic acid, and an aliphatic alcohol.

23) The matte film or sheet according to any one of items 19) to 22), further comprising 5 wt % or less of a particulate polymer (D) having an average particle size of 10 μm or smaller based on 100 wt % in total of the polylactic acid resin (A), the inorganic filler (F) and the plasticizer (C).

24) A multilayered matte film or sheet comprising the matte film or sheet according to any one of items 19) to 23) stacked so that the surface having a surface gloss of 60% or less is at least one external surface.

25) A method for manufacturing the matte film or sheet according to any one of items 1) to 24), comprising the steps of: selecting a resin nonadhesive to at least one surface of the matte film or sheet; bringing the nonadhesive resin layer into contact with at least the one surface of the matte film or sheet; forming a co-extrusion film or sheet containing the at least one nonadhesive resin layer, and then removing the nonadhesive resin layer to obtain the matte film or sheet.

26) A packaging material comprising the matte film or sheet according to any one of items 1) to 24).

27) An agricultural material comprising the matte film or sheet according to any one of items 1) to 24).

28) Wall paper comprising the matte film or sheet according to any one of items 1) to 24) stacked on the surface.

29) A screen comprising the matte film or sheet according to any one of items 1) to 24) stacked on the surface.

30) An interior decoration comprising the matte film or sheet according to any one of items 1) to 24) stacked on the surface.

31) A commodity, a school supply, a stationery or a notebook comprising the matte film or sheet according to any one of items 1) to 24) stacked on the surface.

32) A paper product or a paper container comprising the matte film or sheet according to any one of items 1) to 24) stacked on the surface.

33) A fabric product, a textile product or a table cloth comprising the matte film or sheet according to any one of items 1) to 24) stacked on the surface.

Effects of the Invention

A first aspect of the matte film or sheet of the present invention includes a polylactic acid resin, a chemically modified starch and a plasticizer; is advantageous from the viewpoint of environmental protection, because the polylactic acid resin and the chemically modified starch which are main components are biodegradable, and consequently do not produce a residue due to inactive particles during biodegradation or incineration when disposed after use; has also adequate film-forming stability; and is used singly or as a laminate with another material.

A second aspect of the matte film or sheet of the present invention includes a polylactic acid resin, starch and a plasticizer; is advantageous from the viewpoint of environmental protection, because the polylactic acid resin and the starch which are main components are biodegradable, and consequently do not produce a residue due to inactive particles during biodegradation or incineration when disposed after use; has also adequate film-forming stability; and is used singly or as a laminate with another material.

A third aspect of the matte film or sheet of the present invention includes a polylactic acid resin, a particulate polymer, and a plasticizer as needed; is advantageous from the viewpoint of environmental protection, because the polylactic acid resin which is a main component is biodegradable, and consequently does not produce a residue due to inactive particles during incineration when disposed after use; has also adequate film-forming stability; and is used singly or as a laminate with another material.

A fourth aspect of the matte film or sheet of the present invention includes a polylactic acid resin, an inorganic filler, and a plasticizer as needed; is advantageous from the viewpoint of environmental protection when disposed after use, because the polylactic acid resin which is a main component is biodegradable; has also adequate film-forming stability; and is used singly or as a laminate with another material.

Specifically, the matte film or sheet of the present invention has the effects of: imparting matte properties to a packaging material and an agricultural material; and imparting high quality and modest appearance with controlled gloss and antifouling and water proofing functions, to a wall paper, a screen, an interior decoration, a commodity, a school supply, a stationery and a notebook, a paper product, a paper container, a fabric product, a textile product or a table cloth.

BEST MODE FOR CARRYING OUT THE INVENTION

Figure 1:
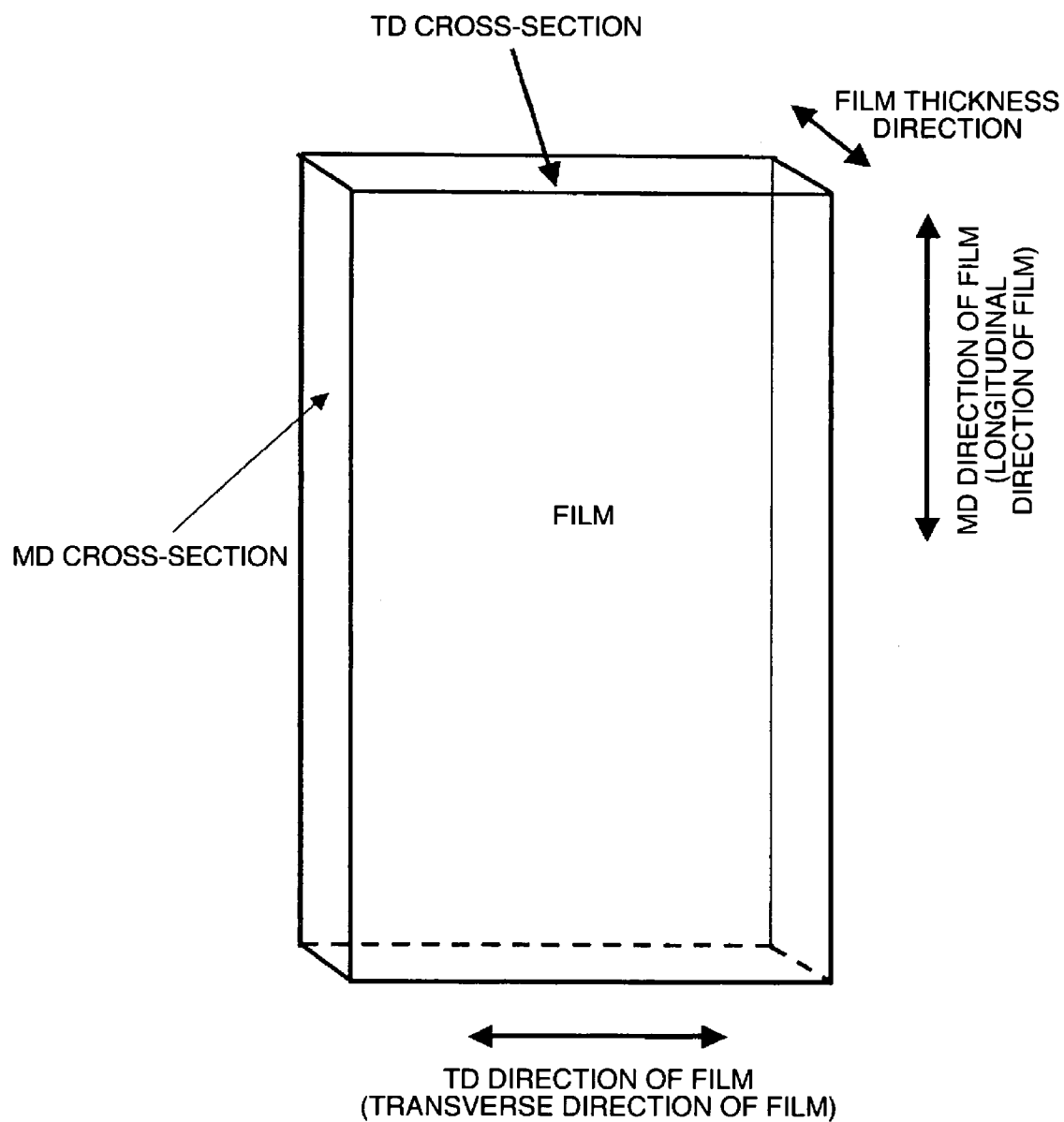
FIG. 1 is an explanatory drawing for positions in a TD cross-section and an MD cross-section when the photographs are taken with a transmission electron microscope.

The present invention will be specifically described below with a particular emphasis on a preferred aspect thereof.

First, the matte film or sheet of the present invention consisting of a polylactic acid resin, a chemically modified starch and a plasticizer will be now described.

The matte film or sheet contains a mixture mainly consisting of a polylactic acid resin (A) finally decomposed by a microorganism, a chemically modified starch (B), and a plasticizer (C). In order to provide the matte film or sheet of the present invention, the weight ratios (100% in total) in the mixture of a polylactic acid resin (A), a chemically modified starch (B), and a plasticizer (C) need to be respectively in a range of 55 to 97 wt %, 2 to 30 wt %, and 1 to 15 wt %. Preferably, the polylactic acid resin (A) is in a range of 63 to 94 wt %, the chemically modified starch (B) is in a range of 4 to 25 wt %, and the plasticizer (C) is in a range of 2 to 12 wt %; further preferably, the polylactic acid resin (A) is in a range of 67 to 89 wt %, the chemically modified starch (B) is in a range of 8 to 22 wt %, and the plasticizer (C) is in a range of 3 to 11 wt %; and particularly preferably, the polylactic acid resin (A) is in a range of 70 to 86 wt %, the chemically modified starch (B) is in a range of 9 to 20 wt %, and the plasticizer (C) is in a range of 4 to 10 wt %. When the ratio of the polylactic acid resin (A) is less than 55 wt %, the obtained film or sheet tends to be inferior in mechanical properties, become fragile, and aggravate its film-forming stability; and when the ratio exceeds 97 wt %, the composition can not satisfy the range of 2 to 30 wt % for the chemically modified starch (B), and 1 to 15 wt % for the plasticizer (C). In addition, when the chemically modified starch (B) is less than 2 wt %, the film has inferior matte properties and acquires a surface gloss (45° gloss) of exceeding 60% when measured in accordance with ASTM-D2457-70; and when the chemically modified starch (B) is more than 30 wt %, the film tends to become fragile and can not be stably formed. In addition, when the plasticizer (C) is less than 1 wt %, the film or sheet tends to: have aggravated roughness transferability when a laminate product having roughness formed through embossing or the like is produced, because the film or sheet does not follow the roughness due to the reduced flexibility of the film or sheet; have deteriorated adhesiveness to a substrate; and acquire inferior matte properties. When the plasticizer (C) exceeds 15 wt %, the surface of the film or sheet becomes excessively softened, and the film or sheet formed tends to cause blocking.

A polylactic acid resin (A) used in the present invention is a copolymer containing a polylactic acid homopolymer and 50 wt % or more of a monomer unit of lactic acid, and the copolymer formed of the polylactic acid homopolymer or lactic acid, and a compound selected from the group consisting of other hydroxycarboxylic acid and lactone. When the content of the monomer unit of lactic acid is less than 50 wt %, the film tends to deteriorate the heat resistance and the transparency thereof. The copolymer or a mixture of those copolymers preferably contains 80 wt % or more in total of a polylactic acid homopolymer and a monomer unit of lactic acid; and further preferably contains 90 wt % or more in total of a polylactic acid homopolymer and a monomer unit of lactic acid.

It is conventionally known that there are L-lactic acid and D-lactic acid as optical isomers of lactic acid, and that in the polylactic acid produced by polymerizing them, there are crystalline polylactic acid with an optical purity of about 80% or higher, which is the polylactic acid consisting of about 10% or less D-lactic acid unit and about 90% or more L-lactic acid unit, or about 10% or less L-lactic acid unit and about 90% or more D-lactic acid unit, and amorphous polylactic acid with the optical purity of about 80% or less, which is the polylactic acid consisting of 10 to 90% D-lactic acid unit and 90 to 10% L-lactic acid unit. A polylactic acid resin (A) to be used in the present invention particularly preferably is solely crystalline polylactic acid with the optical purity of 85% or more, or a mixture consisting of the crystalline polylactic acid with the optical purity of 85% or higher and the amorphous polylactic acid with the optical purity of 80% or lower.

A monomer to be used for a component to be copolymerized with lactic acid includes a hydroxycarboxylic acid such as glycolic acid, 3-hydroxybutyric acid, 4-hydroxybutyric acid, 3-hydroxyvaleric acid, 4-hydroxyvaleric acid and 6-hydroxycaproic acid. The monomer also includes an aliphatic cyclic ester such as glycolide, lactide, β-propiolactone, γ-butyrolactone, δ-valerolactone, ε-caprolactone and a lactone in which various groups like a methyl group substitute for a function group in them. The monomer also includes a dicarboxylic acid such as succinic acid, glutaric acid, adipic acid, azelaic acid, sebacic acid, terephthalic acid and isophthalic acid; a polyhydric alcohol including an aromatic polyhydric alcohol such as a bisphenol/ethylene oxide adduct; an aliphatic polyhydric alcohol such as ethylene glycol, propylene glycol, butanediol, hexanediol, octanediol, glycerin, sorbitan, trimethylolpropane and neopentyl glycol; and an ether glycol such as diethylene glycol, triethylene glycol, polyethylene glycol and polypropylene glycol.

A method to be adopted for polymerizing a polylactic acid resin (A) includes a well-known method such as a condensation polymerization method and a ring-opening polymerization method. The method to be adopted also includes a method of increasing a molecular weight with the use of a bonding agent such as polyisocyanate, a polyepoxy compound, acid anhydride and a chloride of polyfunctional acid.

It is preferable that a weight average molecular weight of a polylactic acid resin (A) is in a range of 10,000 to 1,000,000. When the molecular weight is less than 10,000, the film tends to acquire insufficient mechanical properties and when the molecular weight is more than 1,000,000, the film tends not to acquire stable physical properties through a normal forming machine because of having high melt viscosity.

A chemically modified starch (B) used in the present invention is a mixture of a starch derivative containing at least one starch derivative (b) selected from the group consisting of broken starch, starch ester, starch ether and polyester graft polymer starch; is preferably the mixture of a starch derivative containing 40 wt % or more of at least one starch derivative (b) selected from the group consisting of starch ester, starch ether and polyester graft polymer starch; and is further preferably the mixture of a starch derivative containing 60 wt % or more of at least one starch derivative (b) selected from the group consisting of starch ester, starch ether and polyester graft polymer starch; and particularly preferably is at least one starch derivative (b) selected from the group consisting of starch ester, starch ether and polyester graft polymer starch. In addition, the chemically modified starch (B) is dispersed in a polylactic acid resin (A) more easily than an unmodified starch (E), so that the film with uniform matte properties and film-forming stability is easily obtained; and the chemically modified starch (B) has lower hygroscopic properties than the unmodified starch (E), so that the film obtained by mixing itself with the polylactic acid resin (A) has preferably excellent antifouling properties.

In a chemically modified starch (B) used in the present invention, a resin to be mixed with a starch derivative (b) for the purpose of improving the extrudability and formability of the starch derivative (b) and improving physical properties such as strength, elongation and flexibility of an obtained formed article is not limited in particular; but is preferably a thermoplastic resin in order to improve the extrudability of the starch derivative (b); is preferably a resin having a glass transition temperature Tg of 10° C. or lower in order to impart flexibility to the obtained formed article; and is preferably a biodegradable resin in order to effectively make use of the biodegradability of the polylactic acid resin (A) and the starch derivative (b). A more preferred resin which is mixed with the starch derivative (b) and forms a starch derivative mixture is a biodegradable polyester (d) with a glass transition temperature Tg of 10° C. or lower.

The starch derivative (b) is derived from various types of starch, which are a mixture (molecular formula $(C_6H_{10}O_5)_n$) of amylose (linear polymer) and amylopectin (branched polymer), such as corn starch, potato starch, tapioca starch, rice starch, wheat starch and cassava starch. A broken starch is obtained by heating it to a high temperature of about 80 to 210° C. in the presence of various plasticizers or water under a shearing condition, and consequently making the component of starch receive endothermic transfer and cause the disarrangement of molecules of starch granules. In addition, starch ester, starch ether or polyester graft polymer starch is prepared with the use of the broken starch, various acid anhydrides, organic acids, acid chlorides, ketenes or other esterification-etherification reagents, and is thermoplastic. The starch ester includes an esterified starch with a high substitution degree, an esterified vinyl ester graft polymer starch and an esterified polyester graft polymer starch. The starch ether includes an etherified starch with high substitution degree, an etherified vinyl ester graft polymer starch and an etherified polyester graft polymer starch.

A particularly preferably used starch derivative (b) in the present invention includes, for instance; an esterified starch with a high substitution degree of 0.4 to 2.5 DS, in which hydrogen of a reactive hydroxyl group in a starch molecule is substituted (esterified) by a hydrocarbon-containing group having 2 to 24 carbon atoms (acyl group, alkyl group, cycloalkyl group, alkylene group and aryl group) with the use of a saturated fatty acid, an unsaturated fatty acid, or an aromatic carboxylic acid, as is disclosed in National Publication of International Patent Application No. 8-507101 and Japanese Patent No. 3154056; an esterified vinyl ester graft polymer starch which has an esterification substitution degree of 0.1 to 2.8 DS and a graft degree of 50 wt % or less, after starch has been esterified by the saturated fatty acid, the unsaturated fatty acid or the aromatic carboxylic acid having 2 to 18 carbon atoms, as is disclosed in National Publication of International Patent Application No. 8-507101, and after the polyvinyl ester of those has been grafted; and an esterified polyester graft polymer starch which has an esterification substitution degree of 0.1 to 3.0 MS and a grafted-molecule substitution degree of 0.1 to 20 MS, after starch has been esterified by a saturated fatty acid, an unsaturated fatty acid or an aromatic carboxylic acid having 2 to 18 carbon atoms, as is disclosed in Japanese Patent No. 2742892, and after a polyester of a ring-opening polymer of lactone having 4 to 12 cyclic members, in which the terminal hydroxyl group is substantially blocked by ester, has been grafted. It is supposed that the above described starch derivatives give comparatively satisfactory extrudability.

In the above description, a DS value indicates a esterification-etherification degree of a starch derivative, and is a number (average) of a substituted hydroxyl group (including a grafted terminal hydroxyl group) per one glucose residue among reactive hydroxyl groups (3 groups of 2-, 3- and 6- (or 4-) positions) in the starch derivative. (When DS is 3, a blocked rate (substitution ratio) of the reactive hydroxyl group is 100%). The MS value is a value determined through the expression: {(weight of grafted lactone)/molecular weight of lactone/(weight of prepared starch/molecular weight of starch)}.

The glass transition temperature Tg of a starch derivative (b) used in the present invention is preferably in a range of 100 to 170° C., further preferably is in a range of 110 to 150° C., and particularly preferably is in a range of 115 to 140° C. When the glass transition temperature Tg of the starch derivative (b) is lower than 100° C., the starch derivative (b) tends to give the film reduced matte effects; and when the Tg is higher than 170° C. the starch derivative (b) tends to give the resin deteriorated extrudability, sharply increase its hygroscopic properties, and consequently make the resin hardly produce an adequate film.

A biodegradable polyester (d) with a glass transition temperature Tg of 10° C. or lower preferably used in the present invention is a polymer composition consisting of one or more biodegradable polyesters any of which is at least one compound selected from the group consisting of: an aliphatic polyester in which an aliphatic dicarboxylic acid and an aliphatic diol of main components are polycondensed; an aliphatic polyester formed by ring-opening polymerizing a cyclic lactone; a synthetic aliphatic polyester; an aliphatic polyester such as poly(hydroxyalkanoic acid) biosynthesized in a bacterial cell; and an aliphatic aromatic polyester having a structure in which an aromatic compound is substituted for one part of the above biodegradable polyesters in such an extent as not to lose biodegradability: and any of which has a glass transition temperature Tg of preferably 10° C. or lower, more preferably 0° C. or lower and further preferably −20° C. or lower, when measured by differential scanning calorimetry (JIS-K-7121). When the Tg of the biodegradable polyester (d) is higher than 10° C., the obtained film may not show the effects of improving flexibility and workability.

An aliphatic polyester in which an aliphatic dicarboxylic acid and an aliphatic diol of main components are polycondensed includes, for instance, a polycondensate formed of: one or more compounds selected from aliphatic carboxylic acids (which may include aromatic carboxylic acid such as terephthalic acid and isophthalic acid in such extent as not interrupt biodegradability), such as succinic acid, glutaric acid, adipic acid, suberic acid, azelaic acid, sebacic acid and dodecane diacid; and one or more compounds selected from aliphatic diols such as ethylene glycol, 1,3-propione glycol, 1,4-butanediol and 1,4-cyclohexane dimethanol. An aliphatic polyester formed by ring-opening polymerizing a cyclic lactone includes, for instance, a ring-opening polymer formed of one or more compounds selected from cyclic monomers such as ε-caprolactone, δ-valerolactone and β-methyl-δ-valerolactone. A synthetic aliphatic polyester includes, for instance, a copolymer formed of a cyclic acid anhydride such as succinic anhydride, ethylene oxide and propylene oxide, and an oxirane.

In addition, a poly(hydroxyalkanoic acid) biosynthesized in a bacterial cell includes, for instance, poly(3-hydroxybutyric acid), poly(3-hydroxypropionic acid), poly(3-hydroxyvaleric acid), poly(3-hydroxybutyric acid-3-hydroxyvaleric acid) copolymer, poly(3-hydroxybutyric acid-3-hydroxyhexanoic acid) copolymer, poly(3-hydroxybutyric acid-3-hydroxypropionic acid) copolymer, poly(3-hydroxybutyric acid-4-hydroxybutyric acid) copolymer, poly(3-hydroxybutyric acid-3-hydroxyoctanoic acid) copolymer, and poly(3-hydroxybutyric acid-3-hydroxydecanoic acid) copolymer. An aliphatic aromatic polyester includes, for instance, polybutylene succinic acid-phthalic acid copolymer, polyethylene-succinic acid-phthalic acid copolymer, polybutylene-adipic acid-phthalic acid copolymer, polyethylene-adipic acid-phthalic acid copolymer, polyethylene-glutaric acid-terephthalic acid copolymer, polybutylene-glutaric acid-terephthalic acid copolymer, and polybutylene-succinic acid-adipic acid-phthalic acid copolymer.

A biodegradable polyester (d) with a glass transition temperature Tg of 10° C. or lower particularly preferably used in the present invention is the aliphatic polyester among the above described polyesters, in which an aliphatic dicarboxylic acid having 2 to 10 carbon atoms and an aliphatic diol having 2 to 10 carbon atoms of main components are polycondensed. Specific examples thereof include polyethylene adipate, polypropylene adipate, polybutylene adipate, polyhexene adipate, polybutylene glutarate, polybutylene succinate and polybutylene succinate adipate.

As a polymerization method for a biodegradable polyester (d), a well-known method such as a direct process and an indirect process can be adopted. The direct process is a method of selecting, for instance, the above described dicarboxylic acid compound or acid anhydride thereof or a derivative thereof as an aliphatic dicarboxylic acid component, selecting the above described diol compound or the derivative thereof as the aliphatic diol component, and polycondensing them; and can provide a high-molecular-weight substance while removing moisture generated in the step of polycondensation. In the indirect process, the high-molecular-weight substance can be obtained by adding a small amount of a chain extender, for instance, a diisocyanate compound such as hexamethylene diisocyanate, isophorone diisocyanate, xylylene diisocyanate and diphenylmethane diisocyanate, to an oligomer which has been polycondensed in the direct process.

The weight average molecular weight of biodegradable polyester (d) is preferably in a range of 20,000 to 500,000, and is further preferably in a range of 50,000 to 250,000. When the molecular weight is less than 20,000, by blending the biodegradable polyester (d) with a starch derivative (b) is occasionally inferior in practical physical properties such as mechanical strength and impact strength; and when the molecular weight is more than 500,000, the obtained resin occasionally is inferior in formability.

A plasticizer (C) used in the present invention can be selected and employed from those that have been generally used in the industry, is preferably a compound which does not bleed out even when about 15 wt % of the compound is added to a resin composition, and is preferably harmless and safe to a human body. The plasticizer includes, for instance, phthalic acid ester, aliphatic dibasic acid ester, polyhydroxycarboxylic acid ester, polyhydric alcohol ester, fatty acid ester, phosphoric acid ester and an epoxy plasticizer. The plasticizer more preferably includes aliphatic dibasic acid ester, polyhydroxycarboxylic acid ester, polyhydric alcohol ester, fatty acid ester and an epoxy plasticizer; further preferably is an ester formed of a combination of two or more compounds selected from the group consisting of an aliphatic carboxylic acid having 7 or less carbon atoms, an aliphatic hydroxycarboxylic acid having 7 or less carbon atoms, and an aliphatic alcohol having 7 or less carbon atoms; and particularly preferably is an ester formed of a combination of two or more compounds selected from the group consisting of an aliphatic carboxylic acid having 6 or less carbon atoms, an aliphatic hydroxycarboxylic acid having 6 or less carbon atoms, and an aliphatic alcohol having 6 or less carbon atoms.

A phthalic ester includes, for instance, dimethyl phthalate, diethyl phthalate, diisobutyl phthalate, dibutyl phthalate and dioctyl phthalate.

An aliphatic dibasic acid includes, for instance, diisodecyl succinate, dioctyl adipate, diisodecyl adipate, dioctyl azelate, dibutyl sebacate and dioctyl sebacate.

A polyhydroxycarboxylic acid ester includes, for instance, acetyltributyl citrate, acetyl tri-2-ethylhexyl citrate and tributyl citrate.

An ester of a polyhydric alcohol includes, for instance, glycerin triacetate, glycerin tributyrate, an acetylated monoglyceride plasticizer, diethylene glycol dibenzoate, dipentaerythritol hexaester and pentaerythritol ester.

A fatty acid ester includes, for instance, butyl oleate, methyl acetylricinoleate, chlorinated methyl fatty acid ester, and adipic ether/ester.

A phosphoric acid ester includes, for instance, trioctyl phosphate and trichloroethyl phosphate. An epoxy plasticizer includes, for instance, epoxidized soybean oil, epoxidized linseed oil, epoxy butyl stearate and epoxy octyl stearate.

The matte film or sheet of the present invention needs to have at least one side of the film or sheet controlled to a surface gloss (450 gloss) of 60% or lower, when measured with a glossmeter (ASTM-D2457-70). The film or sheet has more preferably a surface gloss (45° gloss) of 30% or less, further preferably of 20% or less, and particularly preferably of 10% or less. The film or sheet having a gloss of more than 60% becomes inferior in matte properties.

In addition, the film or sheet of the present invention has a micro phase-separation structure in which a polylactic acid resin (A) forms a matrix and a chemically modified starch (B) forms a domain, and in a cross-section cut in the transverse direction of the film or sheet (referred to as TD cross-section), an average of the cross-sectional areas of larger first 20% domains when the cross-sectional areas are count down among all the domains of the chemically modified starch (B) is preferably 20,000 $nm^2$ (square nanometers) or larger. The film or sheet has the micro phase-separation structure in which the average of the cross-sectional areas of larger first 20% domains when the cross-sectional areas are count down among all the domains of the chemically modified starch (B) is further preferably 30,000 $nm^2$ or larger; and the average of the cross-sectional areas of larger first 20% domains when the cross-sectional areas are count down among all the domains of the chemically modified starch (B) is particularly preferably 40,000 $nm^2$ or larger.

When having the micro phase-separation structure in which the average of the cross-sectional areas of larger first 20% domains when the cross-sectional areas are count down among all the domains of a chemically modified starch (B) is smaller than 20,000 $nm^2$, the film or sheet hardly shows an adequate matte properties. In order to make the average of the cross-sectional areas of larger first 20% domains when the cross-sectional areas are count down among all domains of the chemically modified starch (B) in a TD cross-section of the film or sheet to 20,000 $nm^2$ or larger, it is recommended to employ a starch derivative (b) having higher Tg because of giving the film or sheet a larger average cross-section area, though the effect varies depending on a structure and a composition of the chemically modified starch (B) and thus the Tg is not specifically limited.

An example of a preferred micro phase-separation structure has rod-shaped or tabular domains which are formed of the chemically modified starch (B) and have a length of 1 to 20 μm or longer, a width of about 1 to 3 μm and a thickness of about 50 to 500 nm, dispersed in a matrix formed of a polylactic acid resin (A), when observed in the MD direction of a film (longitudinal direction of a film). In the above description, the tabular domain includes not only a domain with a planar and tabular shape but also a tabular domain with a curved surface shape, a tabular domain with a three-dimensionally twisted curve surface, and domains with such shapes that they are partially bent; and the rod-shaped domain includes not only a domain with a linear shape but also a rod-shaped domain with a curve shape, a rod-shaped domain with a three-dimensionally twisted curve shape and domains with such shapes that these rod-shaped domains are partially bent.

Figure 2:
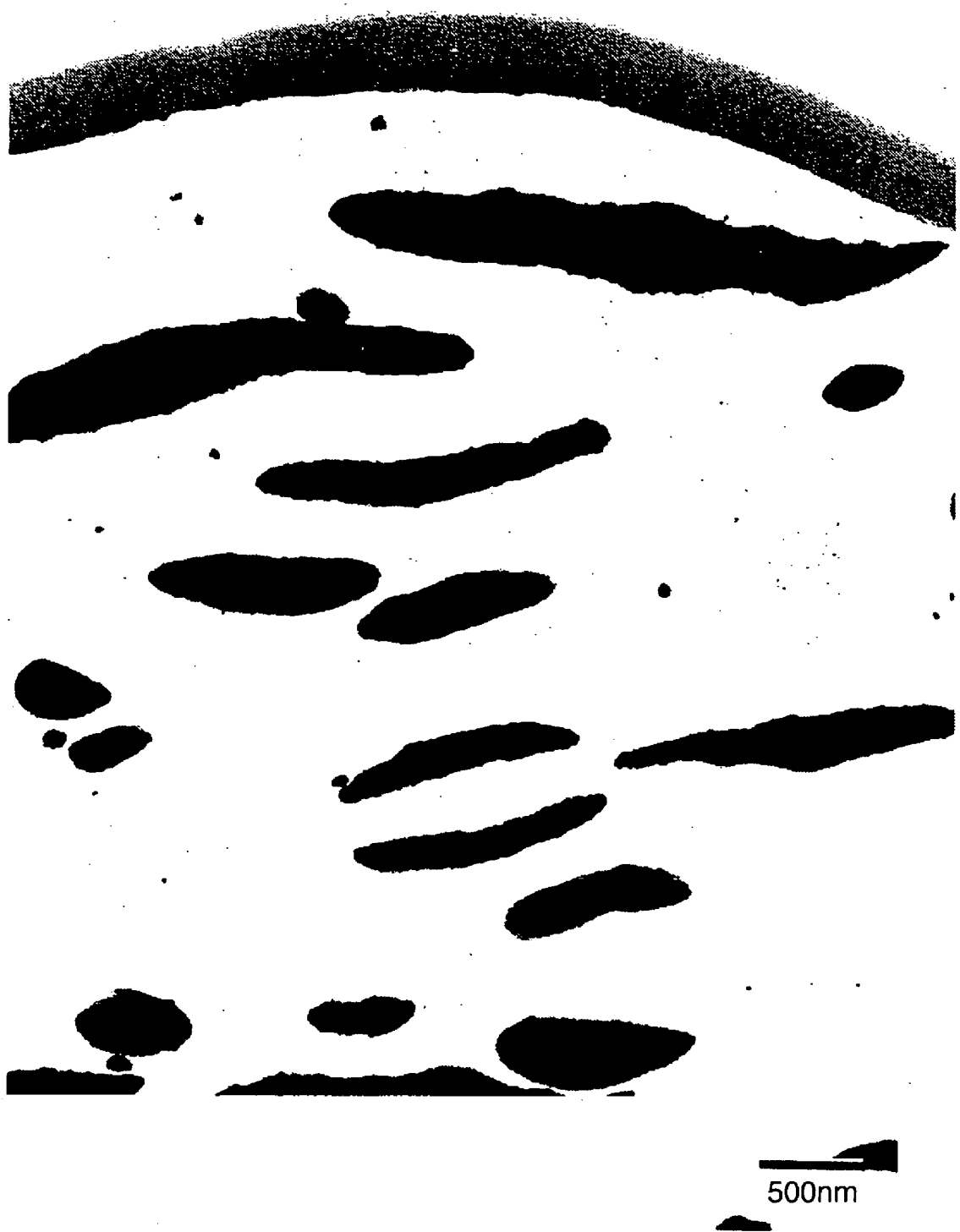
FIG. 2 is a photograph taken with a transmission electron microscope for a TD cross-section of a film in Example A18.
Figure 3:
FIG. 3 is a photograph taken with a transmission electron microscope for an MD cross-section of a film in Example A18.
Figure 4:
FIG. 4 is a photograph taken with a transmission electron microscope for a TD cross-section of a film in Example A1.
Figure 5:
FIG. 5 is a photograph taken with a transmission electron microscope for a TD cross-section of a film in Example A24.
Figure 6:
FIG. 6 is a photograph taken with a transmission electron microscope for an MD cross-section of a film in Example A24.
Figure 7:
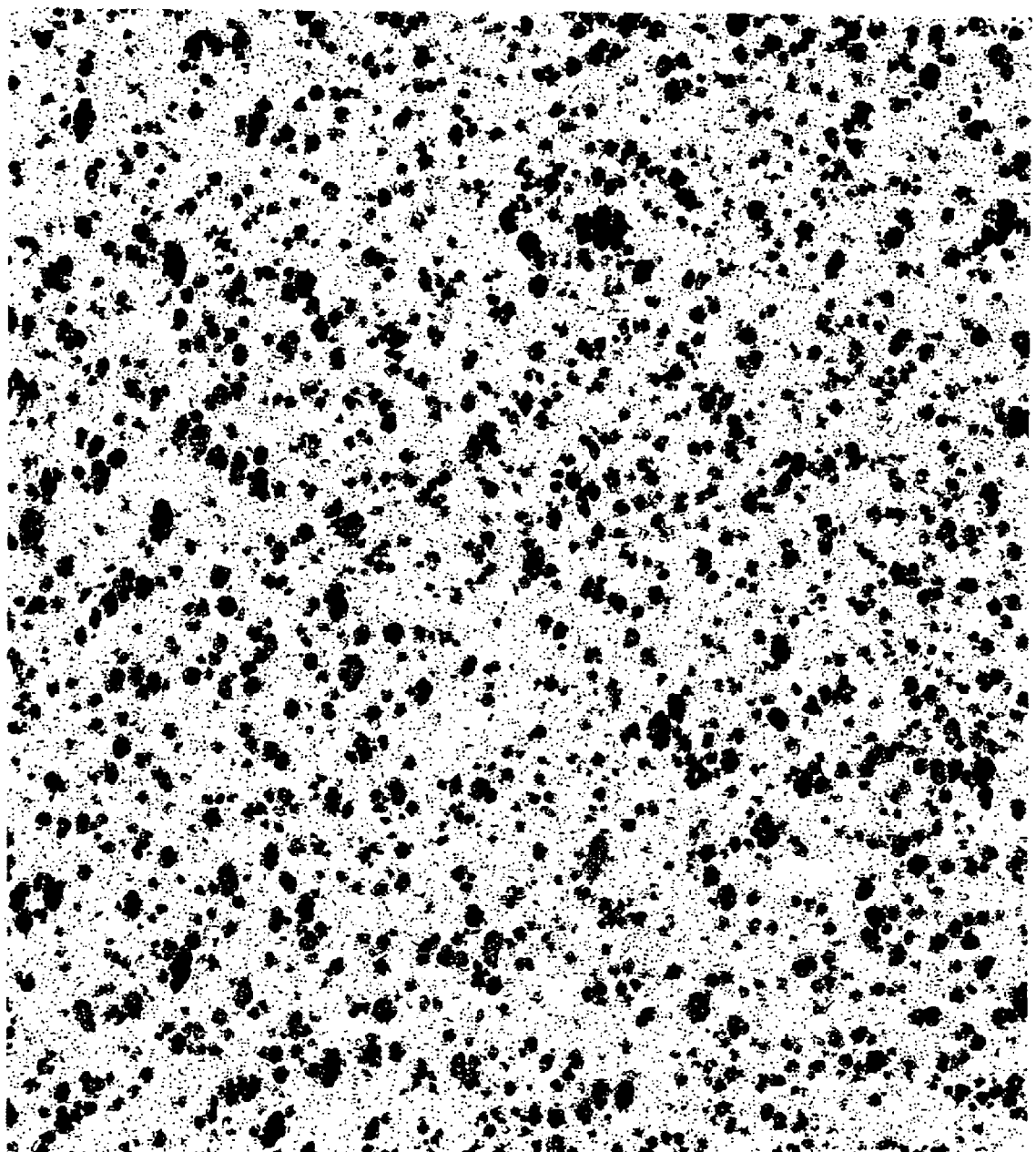
FIG. 7 is a photograph taken with a transmission electron microscope for a TD cross-section of a film in Example A36.

When a TD cross-section of a film will be observed through a photograph taken with an electron microscope by using a method which will be described later, as is shown in FIG. 2 for instance, a tabular domain which is a black part appearing to be elliptic or thickly linear and is formed of a chemically modified starch (B) is a TD cross-section of a rod-shaped domain, and a white part surrounding the black part is a matrix formed of a polylactic acid resin (A). In addition, photographs of the TD cross-section of the same sample taken with an electron microscope are shown in FIG. 2 and FIG. 3, and photographs of the cross-section (referred to as MD cross-section) which has been cut perpendicularly to a film surface in a longitudinal direction of a film are shown in FIG. 5 and FIG. 6. From those figures, it is understood that a domain of the chemically modified starch (B) forms a rod-shaped or tabular domain in the matrix formed of the polylactic acid resin (A).

It is preferable that the matte film or sheet of the present invention includes 0.05 wt % or more but 5 wt % or less of a particulate polymer (D) having an average particle size of 10 μm or smaller, based on 100 wt % in total of a polylactic acid resin (A), a chemically modified starch (B) and a plasticizer (C). The addition of the particulate polymer is preferable because of improving the performance such as hydrophobicity and water repellency of the film or sheet, and improving surface hardness as well. More preferably, the film or sheet includes at least one particulate polymer which has an average particle size of 5 μm or smaller and is selected from the group consisting of a silicone resin, silicone rubber, a polytetrafluoroethylene (PTFE) resin, a styrene resin, a divinylbenzene resin, a polyacetal resin, an acrylic resin, an cellulose acetate resin, a phenolic resin, a melamine resin, an epoxy resin and a nylon resin. Particularly preferably, the film or sheet includes at least one particulate polymer which has an average particle size of 5 μm or smaller, and is selected from the group consisting of the silicone resin, the silicone rubber, the polytetrafluoroethylene (PTFE) resin, the styrene resin, the divinylbenzene resin, the polyacetal resin, the acrylic resin and the cellulose acetate resin. When the average particle size of the particulate polymer exceeds 10 μm, the particulate polymer tends to cause a defect in a thin film to deteriorate the film-forming stability. In addition, when a content of the particulate polymer (D) is less than 0.05 wt % based on 100 wt % in total of the polylactic acid resin (A), the chemically modified starch (B) and the plasticizer (C), the particulate polymer (D) does not show the effect of its addition; and when the content exceeds 5 wt %, the particulate polymer (D) tends to easily agglomerate because of compatibility with a resin blend consisting of the polylactic acid resin (A), the chemically modified starch (B) and the plasticizer (C).

In addition, the matte film or sheet of the present invention can employ singly a recycled raw material which has been obtained by reprocessing trim waste or the like produced when forming a film of the resin, and pelletizing or pulverizing it, in addition to the above described virgin raw material, for a raw resin; or can employ a mixture of the recycled raw material and the virgin raw material.

Second, the matte film or sheet of the present invention consisting of a polylactic acid resin, starch and a plasticizer will be now described.

The matte film or sheet of the present invention contains a mixture mainly consisting of a polylactic acid resin (A) finally decomposed by a microorganism, a starch (E) and a plasticizer (C). In order to provide the matte film or sheet of the present invention, the weight ratios (100% in total) in the mixture of a polylactic acid resin (A), a starch (E), and a plasticizer (C) need to be respectively in a range of 45 to 97.5 wt %, 2 to 40 wt %, and 0.5 to 15 wt %. Preferably, the polylactic acid resin (A) is in a range of 53 to 95 wt %, the starch (E) is in a range of 4 to 35 wt %, and the plasticizer (C) is in a range of 1 to 12 wt %; further preferably, the polylactic acid resin (A) is in a range of 59 to 90 wt %, the starch (E) is in a range of 8 to 30 wt %, and the plasticizer (C) is in a range of 2 to 11 wt %; and particularly preferably, the polylactic acid resin (A) is in a range of 65 to 86 wt %, the starch (E) is in a range of 9 to 25 wt %, and the plasticizer (C) is in a range of 4 to 10 wt %. When the ratio of the polylactic acid resin (A) is less than 45 wt %, the obtained film or sheet tends to be inferior in mechanical properties, become fragile, and aggravate its film-forming stability; and when the ratio exceeds 97.5 wt %, the composition can not satisfy the range of 2 to 40 wt % for the starch (E), and 0.5 to 15 wt % for the plasticizer (C).

In addition, when the starch (E) is less than 2 wt %, the film has inferior matte properties and acquires a surface gloss (45° gloss) of exceeding 60% when measured in accordance with ASTM-D2457-70; and when the starch (E) is more than 40 wt %, the film tends to be fragile, making it impossible stably form the film. In addition, when the plasticizer (C) is less than 0.5 wt %, the plasticizer (C) aggravates the dispersibility of the starch (E) into a polylactic acid resin (A), and hardly provides a uniform film having adequate film-forming stability; tends to have aggravated roughness transferability when a laminate product having roughness formed through embossing or the like is produced, because the film or sheet does not follow the roughness due to the reduced flexibility of the film or sheet; tends to have deteriorated adhesiveness to a substrate; and tends to acquire inferior matte properties. When the plasticizer (C) exceeds 15 wt %, the surface of the film or sheet becomes excessively softened, and the film or sheet formed tends to cause blocking.

A starch (E) used in the present invention is one of biomass produced through a photosynthetic reaction of a green plant, as is described in pp. 40 to 43 in Handbook of plant metabolic engineering published by NTS Inc. The starch is a substance stored in a tissue of a seed, a root, a tuber and the like, of many plants; is widely distributed in the plant world; particularly, is stored in a storage tissue of grains such as rice, wheat and corn, and potatoes such as potato, sweet potato and cassava in a large amount; and has been food for many animals, and most notably for human beings, since old times. The starch includes various types of starch, which are a mixture (molecular formula $(C_6H_{10}O_5)_n$) of amylose (linear polymer) and amylopectin (branched polymer), such as corn starch, potato starch, tapioca starch, rice starch, wheat starch and cassava starch.

A plasticizer (C) used in the present invention can be selected and employed from those that have been generally used in a relevant industry, is preferably a compound which does not bleed out even when about 15 wt % of the compound is added to a resin composition, and is preferably harmless and safe to a human body. The plasticizer includes, for instance, phthalic acid ester, aliphatic dibasic acid ester, polyhydroxycarboxylic ester, polyhydric alcohol ester, fatty acid ester, phosphoric acid ester, an epoxy plasticizer and an aliphatic polyhydric alcohol. More preferred plasticizers are an aliphatic dibasic ester, polyhydroxycarboxylic acid ester, polyhydric alcohol ester, fatty acid ester, epoxy plasticizer and aliphatic polyhydric alcohol; and further preferred plasticizers are an aliphatic polyhydric alcohol which has adequate compatibility with starch, and a mixture of the aliphatic polyhydric alcohol and another plasticizer. A particularly preferred plasticizer is a mixture consisting of 10 to 90 wt % of an aliphatic polyhydric alcohol having two or more hydroxyl groups in the molecule and 10 or less carbon atoms, and 90 to 10 wt % of another plasticizer; and a further particularly preferred plasticizer is a mixture consisting of 10 to 90 wt % of an aliphatic polyhydric alcohol having three or more hydroxyl groups in the molecule and 10 or less carbon atoms, and 90 to 10 wt % of another plasticizer. When the content of the aliphatic polyhydric alcohol is less than 10 wt %, the starch tends to deteriorate its dispersibility, and when the content exceeds 90 wt %, the aliphatic polyhydric alcohol tends to bleed out.

A phthalic ester includes, for instance, dimethyl phthalate, diethyl phthalate, diisobutyl phthalate, dibutyl phthalate and dioctyl phthalate.

An aliphatic dibasic acid includes, for instance, diisodecyl succinate, dioctyl adipate, diisodecyl adipate, dioctyl azelate, dibutyl sebacate and dioctyl sebacate.

A polyhydroxycarboxylic acid ester includes, for instance, acetyltributyl citrate, acetyl tri-2-ethylhexyl citrate and tributyl citrate.

An ester of a polyhydric alcohol includes, for instance, glycerin triacetate, glycerin tributyrate, an acetylated monoglyceride plasticizer, diethylene glycol dibenzoate, dipentaerythritol hexaester and pentaerythritol ester.

A fatty acid ester includes, for instance, butyl oleate, methyl acetylricinoleate, chlorinated methyl fatty acid ester, and adipic ether/ester.

A phosphoric acid ester includes, for instance, trioctyl phosphate and trichloroethyl phosphate. An epoxy plasticizer includes, for instance, epoxidized soybean oil, epoxidized linseed oil, epoxy butyl stearate and epoxy octyl stearate.

An aliphatic polyhydric alcohol includes, for instance, a polyhydric alcohol having two hydroxyl groups in the molecule such as ethylene glycol, propyleneglycol and butanediol; and a polyhydric alcohol having three hydroxyl groups in the molecule such as glycerin, pentaerythritol, sorbitol and trimethylolpropane. A particularly preferred one is glycerin.

The matte film or sheet of the present invention needs to have at least one side of the film or sheet controlled to a surface gloss (45° gloss) of 60% or lower, when measured with a glossmeter (ASTM-D2457-70). The film or sheet has more preferably a surface gloss (45° gloss) of 30% or less, further preferably of 20% or less, and particularly preferably of 10% or less. The film or sheet having a gloss of more than 60% becomes inferior in matte properties.

In addition, the matte film or sheet of the present invention has preferably a micro phase-separation structure in which a polylactic acid resin (A) forms a matrix and a starch (E) forms a domain. Further preferably, an average of the cross-sectional areas of larger first 20% domains when the cross-sectional areas are count down among all the domains of the starch (E), in a cross-section cut in the transverse direction of the film or sheet (referred to as TD cross-section), is 20,000 nm$^2$ or larger. The film or sheet has the micro phase-separation structure in which the average of the cross-sectional areas of larger first 20% domains when the cross-sectional areas are count down among all the domains of the starch (E) is further preferably 30,000 nm$^2$ or larger; and the average of the cross-sectional areas of larger first 20% domains when the cross-sectional areas are count down among all the domains of the starch (E) is particularly preferably 40,000 nm$^2$ or larger.

When having the micro phase-separation structure in which the average of the cross-sectional areas of larger first 20% domains when the cross-sectional areas are count down among all the domains of a starch (E) is smaller than 20,000 nm$^2$, the film or sheet hardly shows an adequate matte properties. In order to make the average of the cross-sectional areas of larger first 20% domains when the cross-sectional areas are count down among all the domains of the starch (E) in a TD cross-section of the film or sheet to 20,000 nm$^2$ or larger, it is preferable to select a plasticizer (C) to be used from the plasticizers with adequate compatibility with the starch (E), though the effect varies depending on a structure and a composition of the starch and thus the plasticizer is not specifically limited.

In addition, an example of a preferred micro phase-separation structure has spherical, rod-shaped or tabular domains formed of a starch (E) dispersed in a matrix formed of a polylactic acid resin (A). The spherical domain includes not only a genuine spherical domain but also a domain with an ellipsoidal shape which is formed by elongating a sphere. The tabular domain includes not only a domain with a planar and tabular shape but also a tabular domain with a curved surface shape, a tabular domain with a three-dimensionally twisted curve surface, and domains with such shapes that they are partially bent. The rod-shaped domain includes not only a domain with a linear shape but also a rod-shaped domain with a curve shape, a rod-shaped domain with a three-dimensionally twisted curve shape and domains with such shapes that these rod-shaped domains are partially bent.

It is preferable that the matte film or sheet of the present invention includes 0.05 wt % or more but 5 wt % or less of a particulate polymer (D) having an average particle size of 10 μm or smaller, based on 100 wt % in total of a polylactic acid resin (A), a starch (E) and a plasticizer (C). The addition of the particulate polymer is preferable because of improving the performance such as hydrophobicity and water repellency of the film or sheet, and improving surface hardness as well. More preferably, the film or sheet includes at least one particulate polymer which has an average particle size of 5 μm or smaller and is selected from the group consisting of a silicone resin, silicone rubber, a polytetrafluoroethylene (PTFE) resin, a styrene resin, a divinylbenzene resin, a polyacetal resin, an acrylic resin, an cellulose acetate resin, a phenolic resin, a melamine resin, an epoxy resin and a nylon resin. Particularly preferably, the film or sheet includes at least one particulate polymer which has an average particle size of 5 μm or smaller, and is selected from the group consisting of the silicone resin, the silicone rubber, the polytetrafluoroethylene (PTFE) resin, the styrene resin, the divinylbenzene resin, the polyacetal resin, the acrylic resin and the cellulose acetate resin. When the average particle size of the particulate polymer exceeds 10 μm, the particulate polymer tends to cause a defect in a thin film to deteriorate the film-forming stability. In addition, when a content of the particulate polymer (D) is less than 0.05 wt % based on 100 wt % in total of the polylactic acid resin (A), a starch (E) and the plasticizer (C), the particulate polymer (D) does not show the effect of its addition; and when the content exceeds 5 wt %, the particulate polymer (D) tends to easily agglomerate because of compatibility with a resin blend consisting of the polylactic acid resin (A), the starch (E) and the plasticizer (C).

In addition, the matte film or sheet of the present invention can employ singly a recycled raw material which has been obtained by reprocessing trim waste produced when forming a film of the resin, and pelletizing or pulverizing it, in addition to the above described virgin raw material, for a raw resin; or can employ a mixture of the recycled raw material and the virgin raw material.

Third, the matte film or sheet of the present invention consisting of a polylactic acid resin and a particulate polymer will be now described.

The matte film or sheet of the present invention contains a mixture mainly consisting of a polylactic acid resin (A) which is finally decomposed by a microorganism, and a particulate polymer (D). In order to provide the matte film or sheet of the present invention, the weight ratios (100% in total) in the mixture of a polylactic acid resin (A) and the particulate polymer (D) need to be respectively in a range of 70 to 99 wt %, and 1 to 30 wt %. Preferably, the polylactic acid resin (A) is in a range of 55 to 98.9 wt %, the particulate polymer (D) is in a range of 1 to 30 wt %, and the plasticizer (C) is in a range of 0.1 to 15 wt %; more preferably, the polylactic acid resin (A) is in a range of 63 to 96.5 wt %, the particulate polymer (D) is in a range of 3 to 25 wt %, and the plasticizer (C) is in a range of 0.5 to 12 wt %; and further preferably, the polylactic acid resin (A) is in a range of 67 to 95 wt %, the particulate polymer (D) is in a range of 5 to 22 wt %, and the plasticizer (C) is in a range of 1 to 11 wt %; and particularly preferably, the polylactic acid resin (A) is in a range of 70 to 91 wt %, the particulate polymer (D) is in a range of 7 to 20 wt %, and the plasticizer (C) is in a range of 2 to 10 wt %. When the ratio of the polylactic acid resin (A) is less than 70 wt %, the obtained film or sheet tends to be inferior in mechanical properties, become fragile, and aggravate its film-forming stability; and when the ratio exceeds 99 wt %, the composition can not satisfy the range of 1 to 30 wt % for the particulate polymer (D).

In addition, when the particulate polymer (D) is less than 1 wt %, the film has inferior matte properties and acquires the surface gloss (45° gloss) of exceeding 60% when measured in accordance with ASTM-D2457-70; and when the particulate polymer (D) is more than 30 wt %, the film tends to become fragile, and not to be stably produced; and the film or sheet tends to have aggravated roughness transferability when a laminate product having roughness formed through embossing or the like is produced, because the film or sheet does not follow the roughness due to the reduced flexibility of the film or sheet, and to have deteriorated adhesiveness to a substrate. When the plasticizer (C) exceeds 15 wt %, the surface of the film or sheet becomes excessively softened, and the film or sheet after having been produced into the film tends to cause blocking.

A polylactic acid resin (A) used in the present invention was described earlier.

A particulate polymer (D) used in the present invention includes a synthetic polymer, a natural polymer, a capsulated powder and a composite powder, as are described in pp. 257 to 259 in "Technologies and applications of polymeric ultra-microspheres" published by CMC Publishing CO., LTD., and the specific examples are described in a list of particulate polymer products in Chapter 6, pp. 283 to 294. They are specifically a particulate polymer obtained from a resin such as a styrene resin, a divinylbenzene resin, a phenol resin, silicone rubber, a silicone resin, low-density polyethylene, high-density polyethylene, an ethylene/acrylate resin, a methyl methacrylate (MMA) resin, a polytetrafluoroethylene (PTFE) resin, a fluorination vinylidene resin, an urethane resin, a cellulose acetate resin, cellulose, a styrene/acrylic resin, a benzoguanamine resin, a benzoguanamine/melamine resin, a melamine resin, an n-butyl acrylate resin, an urea-formaldehyde resin, a nylon resin, a polyacetal resin, a polyphenylene ether resin, a polycarbonate resin, a polyethylene terephthalate resin, a polybutylene telephthalate resin, other engineering resins, a polyether ether ketone (PEEK) resin, a polyarylate resin, a polyethersulfone resin and a polyetherimide resin.

A particulate polymer (D) used in the present invention preferably is a particulate polymer formed of a resin satisfying at least any one of (1) having a glass transition temperature Tg of 60° C. or higher, (2) having a melting point Tm of 100° C. or higher, and (3) being a cross linked polymer; and further preferably is a particulate polymer formed of a resin satisfying at least any one of (1) having a glass transition temperature Tg of 80° C. or higher, (2) having a melting point Tm of 120° C. or higher, and (3) being a cross linked polymer with a glass transition temperature Tg of 60° C. or higher. The particulate polymer is particularly preferably formed of a resin selected from the group consisting of a silicone resin, a polytetrafluoroethylene (PTFE) resin, a polyacetal resin, an acrylic resin, a cellulose acetate resin, a phenol resin, a melamine resin, a benzoguanamine resin, a benzoguanamine/melamine resin, an epoxy resin and a nylon resin.

A particulate polymer (D) used in the present invention preferably has an average particle size of 10 μm or smaller. The particulate polymer (D) has more preferably an average particle size of 7 μm or smaller, further preferably an average particle size of 5 μm or smaller, and particularly preferably an average particle size of 0.1 to 3 μm. When employing the particulate polymer with an average particle size of larger than 10 μm, film-forming stability tends to be decreased so that the resulting thin film with a thickness of 20 μm or less is ruptured or gets a hole, defectively. The average particle size of the particulate polymer is measured with the use of a laser diffraction/scattering type particle size distribution-measuring instrument.

A plasticizer (C) used in the present invention can be selected and employed from those that have been generally used in the industry, is preferably a compound which does not bleed out even when about 15 wt % of the compound is added to a resin composition, and is preferably harmless and safe to a human body. The plasticizer includes, for instance, phthalic ester, aliphatic dibasic ester, polyhydroxycarboxylic acid ester, ester of polyhydric alcohol, fatty acid ester, phosphoric acid ester and an epoxy plasticizer. A more preferred plasticizer includes aliphatic dibasic ester, polyhydroxycarboxylic acid ester, ester of polyhydric alcohol, fatty acid ester and an epoxy plasticizer; a further preferred plasticizer is an ester formed of a combination of two or more compounds selected from the group consisting of an aliphatic carboxylic acid having 7 or less carbon atoms, an aliphatic hydroxycarboxylic acid having 7 or less carbon atoms, and an aliphatic alcohol having 7 or less carbon atoms; and a particularly preferred plasticizer is an ester formed of a combination of two or more compounds selected from the group consisting of an aliphatic carboxylic acid having 6 or less carbon atoms, an aliphatic hydroxycarboxylic acid having 6 or less carbon atoms, and an aliphatic alcohol having 6 or less carbon atoms.

The matte film or sheet of the present invention needs to have at least one side of the film or sheet controlled to a surface gloss (45° gloss) of 60% or lower, when measured with a glossmeter (ASTM-D2457-70). The film or sheet has more preferably a surface gloss (45° gloss) of 30% or less, further preferably of 20% or less, and particularly preferably of 10% or less. The film or sheet having a gloss of more than 60% becomes inferior in matte properties.

In addition, the matte film or sheet of the present invention can employ singly a recycled raw material which has been obtained by reprocessing trim waste produced when producing a film of the resin, and pelletizing or pulverizing it, in addition to the above described virgin raw material, for a raw resin; or can employ a mixture of the recycled raw material and the virgin raw material.

Fourth, the matte film or sheet of the present invention consisting of a polylactic acid resin and an inorganic filler will be now described.

The matte film or sheet of the present invention contains a mixture mainly consisting of a polylactic acid resin (A) which is finally decomposed by a microorganism, and an inorganic filler (F). In order to provide the matte film or sheet of the present invention, the weight ratios (100% in total) in the mixture of a polylactic acid resin (A) and the inorganic filler (F) need to be respectively in a range of 70 to 99.5 wt %, and 0.5 to 30 wt %. Preferably, the polylactic acid resin (A) is in a range of 55 to 99.4 wt %, the inorganic filler (F) is in a range of 0.5 to 30 wt %, and the plasticizer (C) is in a range of 0.1 to 15 wt %; more preferably, the polylactic acid resin (A) is in a range of 63 to 98.9 wt %, the inorganic filler (F) is in a range of 1 to 25 wt %, and the plasticizer (C) is in a range of 0.1 to 12 wt %; and further preferably, the polylactic acid resin (A) is in a range of 71 to 96.9 wt %, the inorganic filler (F) is in a range of 3 to 18 wt %, and the plasticizer (C) is in a range of 0.1 to 11 wt %; and particularly preferably, the polylactic acid resin (A) is in a range of 74 to 92 wt %, the inorganic filler (F) is in a range of 6 to 16 wt %, and the plasticizer (C) is in a range of 2 to 10 wt %. When the ratio of the polylactic acid resin (A) is less than 70 wt %, the obtained film or sheet tends to be inferior in mechanical properties, become fragile, and aggravate its film-forming stability; and when the ratio exceeds 99.5 wt %, the composition can not satisfy the range of 0.5 to 30 wt % for the inorganic filler (F).

In addition, when the content of the inorganic filler (F) is less than 0.5 wt %, the film has inferior matte properties and acquires a surface gloss (45° gloss) of exceeding 60% when measured in accordance with ASTM-D2457-70; and when the content of the inorganic filler (F) is more than 30 wt %, the film tends to become fragile, and not to be stably produced; and the film or sheet tends to have aggravated roughness transferability when a laminate product having roughness formed through embossing or the like is produced, because the film or sheet does not follow the roughness due to the reduced flexibility of the film or sheet, and to have deteriorated adhesiveness to a substrate. When the content of the plasticizer (C) exceeds 15 wt %, the surface of the film or sheet becomes excessively softened, and the film or sheet after having been produced into the film tends to cause blocking.

A polylactic acid resin (A) used in the present invention was described earlier.

An inorganic filler (F) used in the present invention means an inorganic filler described in pp. 30 to 31 in "Resin/filler system kneading technology" published by Technical Information Institute Co., Ltd.; and includes an oxide, a hydroxide, a carbonate, a sulfate, a silicate, a nitride, carbon and the other inorganic fillers.

The oxide includes silica, diatomaceous earth, alumina, zinc oxide, titanium oxide, calcium oxide, magnesium oxide, iron oxide, stannic oxide, antimony oxide and ferrite.

The hydroxide includes calcium hydroxide, magnesium hydroxide, aluminum hydroxide and basic magnesium.

The carbonate includes calcium carbonate, magnesium carbonate, zinc carbonate, barium carbonate, dawsonite and hydrotalcite.

The sulfate includes calcium sulfate, barium sulfate and gypsum fiber.

The silicate includes calcium silicate (wollastonite and xonotlite), talc, clay, mica, montmorillonite, bentonite, activated clay, sepiolite, imogolite, sericite, glass fiber, glass bead and silica baloon.

The nitride includes aluminum nitride, boron nitride and silicon nitride.

The carbon includes carbon black, graphite, carbon fiber, carbon baloon and charcoal powder.

The other inorganic filler includes potassium titanate, lead zirconate titanate, aluminum borate, molybdenum sulfide, silicon carbide, zinc borate and slag fiber.

An inorganic filler (F) used in the present invention preferably has a tabular, spherical or granular shape. The tabular filler includes talc, mica, sericite, glass flake, tabular calcium carbonate, tabular aluminum hydroxide, and hydrotalcite. The spherical and granular filler includes calcium carbonate, silica, clay, various pulverized ore products, various beads, various baloons and tetrapod-shaped zinc oxide. The spherical and granular filler more preferably includes talc, calcium carbonate, clay, silica, mica, sericite and titanium oxide; and particularly preferably includes talc, mica, calcium carbonate and silica.

An inorganic filler (F) used in the present invention preferably has an average particle size of 10 µm or smaller. The inorganic filler (F) has more preferably an average particle size of 7 µm or smaller, and further preferably an average particle size of 5 µm or smaller but 0.1 µm or larger. When employing the inorganic filler with an average particle size of larger than 10 µm, film-forming stability tends to be decreased so that the resulting thin film with a thickness of 20 µm or less is ruptured or gets a hole, defectively. The average particle size of the inorganic filler is measured with the use of a laser diffraction/scattering type particle size distribution-measuring instrument.

A plasticizer (C) used in the present invention can be selected and employed from those that have been generally used in the industry, is preferably a compound which does not bleed out even when about 15 wt % of the compound is added to a resin composition, and is preferably harmless and safe to a human body. The plasticizer includes, for instance, phthalic acid ester, aliphatic acid dibasic ester, polyhydroxycarboxylic ester, ester of polyhydric alcohol, fatty acid ester, phosphoric acid ester and an epoxy plasticizer. The plasticizer more preferably includes aliphatic dibasic acid ester, polyhydroxycarboxylic acid ester, ester of polyhydric alcohol, fatty acid ester and an epoxy plasticizer; further preferably is an ester formed of a combination of two or more compounds selected from the group consisting of an aliphatic carboxylic acid having 7 or less carbon atoms, an aliphatic hydroxycarboxylic acid having 7 or less carbon atoms, and an aliphatic alcohol having 7 or less carbon atoms; and particularly preferably is an ester formed of a combination of two or more compounds selected from the group consisting of an aliphatic carboxylic acid having 6 or less carbon atoms, an aliphatic hydroxycarboxylic acid having 6 or less carbon atoms, and an aliphatic alcohol having 6 or less carbon atoms.

The matte film or sheet of the present invention needs to have at least one side of the film or sheet controlled to a surface gloss (45° gloss) of 60% or lower, when measured with a glossmeter (ASTM-D2457-70). The film or sheet has more preferably a surface gloss (45° gloss) of 30% or less, further preferably of 20% or less, and particularly preferably of 10% or less. The film or sheet having a gloss of more than 60% becomes inferior in matte properties.

It is preferable that the matte film or sheet of the present invention includes 0.03 wt % or more but 5 wt % or less of a particulate polymer (D) having an average particle size of 10 µm or smaller, based on 100 wt % in total of a polylactic acid resin (A), an inorganic filler (F) and a plasticizer (C). The addition of the particulate polymer is preferable because of improved performance such as hydrophobicity, water repellency and slidability of the film or sheet, as well as improved surface hardness of the film or sheet. More preferably, the film or sheet includes at least one particulate polymer which has an average particle size of 5 µm or smaller and is selected from the group consisting of a silicone resin, silicone rubber, a polytetrafluoroethylene (PTFE) resin, a styrene resin, a divinylbenzene resin, a polyacetal resin, an acrylic resin, an cellulose acetate resin, a phenolic resin, a melamine resin, an epoxy resin and a nylon resin. Particularly preferably, the film or sheet includes at least one particulate polymer which has an average particle size of 5 µm or smaller, and is selected from the group consisting of the silicone resin, the silicone rubber, the polytetrafluoroethylene (PTFE) resin, the styrene resin, the divinylbenzene resin, the polyacetal resin, the acrylic resin and the cellulose acetate resin. When the average particle size of the particulate polymer exceeds 10 µm, the particulate polymer tends to cause a defect in a thin film to deteriorate the film-forming stability. In addition, when a content of the particulate polymer (D) is less than 0.03 wt % based on 100 wt % in total of the polylactic acid resin (A), the inorganic filler (F) and the plasticizer (C), the particulate polymer (D) does not show the effect of its addition; and when the content exceeds 5 wt %, the particulate polymer (D) tends to easily agglomerate because of having insufficient compatibility to a resin blend consisting of the polylactic acid resin (A), the inorganic filler (F) and the plasticizer (C).

In addition, the matte film or sheet of the present invention can employ singly a recycled raw material which has been obtained by reprocessing trim waste produced when producing a film of the resin, and pelletizing or pulverizing it, in addition to the above described virgin raw material, for a raw resin; or can employ a mixture of the recycled raw material and the virgin raw material.

Next, a method for manufacturing the matte film or sheet of the present invention will be described.

A method and apparatus for mixing a polylactic acid resin (A), a chemically modified starch (B), a plasticizer (C), a particulate polymer (D), a starch (E) and an inorganic filler (F) are not limited in particular. The method includes, for instance, a method of supplying each raw material of them to the same single-spindle or dual-spindle extrusion kneading machine, melting/mixing them, and extruding the mixed melt in the state through a mouthpiece (die lip) to directly form it into a film or sheet; or a method of extruding the mixed melt into a strand shape to produce a pellet, and then extruding it again to form the film or sheet. In order to improve the dispersibility of the chemically modified starch (B), the particulate polymer (D), the starch (E) and the inorganic filler (F), which are powders, and of the plasticizer (C) which is a liquid, it is preferable to use the dual-spindle extrusion kneading machine. In addition, in order to improve handleability of the starch (E) which is the powder, it is preferable to employ a method of firstly kneading the plasticizer (C) with the starch (E) to improve the workability and the handleability, and then kneading them with the polylactic acid resin.

It is preferable to set a melt-extrusion temperature at a range of 100 to 250° C., though the temperature is appropriately selected in consideration of a melting point and a mixture ratio of a polylactic acid resin. When a chemically modified starch (B) is used, it is preferable to set a die temperature during extrusion at as low a temperature as possible in such an extent as the mixed melt can be formed, because the lower temperature tends to give a formed film adequate matte properties. When the chemically modified starch (B) is used, it is particularly preferable to set the die temperature at a range of 150 to 170° C. In order only to make a film or sheet opaque, it is essential only to mix a resin, inorganic particles and organic particles, which are not compatible with a matrix resin, into the matrix resin, but matte properties can not be obtained only by mixing the resin, inorganic particles and organic particles, which are not compatible with the polylactic acid resin (A), into the polylactic acid resin (A). The matte surface is developed by the chemically modified starch (B), a particulate polymer (D), a starch (E) or an inorganic filler (F), which have higher viscosity than the matrix, because they keep a granular shape, a rod shape, and/or a tabular shape when the polylactic acid resin (A) to become the matrix is oriented and thinned, in such a process that the polylactic acid resin (A) containing the chemically modified starch (B), the particulate polymer (D), the starch (E), or the inorganic filler (F), is oriented in a melt state after having been extruded from a die, without causing large deformation due to flow, and form roughness on the surface of the film or sheet. Accordingly, it is important to select an appropriate die temperature particularly when employing the chemically modified starch (B) which greatly changes its viscosity in the vicinity of the temperature at which the polylactic acid resin (A) is worked.

A method for producing the matte film or sheet of the present invention includes a method of casting the raw material into a cooling roller from a T-die; and a method of no drawing, uniaxial drawing or simultaneous or sequential biaxial drawing the raw material with a conventionally well-known process for producing a film, such as an inflation process and a tenter process. Specifically, there are (1) a method of melting and drawing an extruded tube-shaped or sheet-shaped resin in a melt state to form a film in a tubular film process or a cast process; (2) a method of quenching the extruded tube-shaped or sheet-shaped resin in a molten state, solidifying it in an almost amorphous state, then reheating the tube-shaped or sheet-shaped resin to a glass transition temperature or higher but a melting point or lower, and cold-drawing it in the tubular film process or the roll-tenter process to form the film; or further heat-treating the film or sheet after having been melted and oriented or cold-oriented, while holding it, in order to inhibit the heat shrinkability of the film or sheet, to form the film or sheet. As was described above, the process of drawing a polylactic acid resin (A) of a matrix in a molten state is important for obtaining the matte film. The method of casting the polylactic acid resin (A) into a flat cooling roller in an almost melt state, and the method of rolling it with the two or more flat rollers tend to hinder the chemically modified starch (B), the particulate polymer (D), the starch (E) or the inorganic filler (F), which are to contribute to the matte properties, from forming roughness on the surface of the film or sheet, due to the flat roller, and to decrease the matte properties. In comparison with those methods, the method of extruding the raw material into a tubular-shaped material and forming it into a film or sheet in the tubular film process is preferably used, because the method does not bring the polylactic acid resin (A) of the matrix into contact with the flat roller in an almost molten state, hardly makes the flat roller hinder the chemically modified starch (B), the particulate polymer (D), the starch (E) or the inorganic filler (F), which are to contribute to the matte properties, from forming roughness on the surface of the film or sheet, and consequently tends to provide the film or sheet with adequate matte properties. In addition, the film or sheet obtained by the melting and drawing method is preferable to the film or sheet produced by the cold-drawing method, because the film or sheet is formed of the polylactic acid resin (A) of the matrix having polymer chains with a lower orientation degree, tends to be easily oriented so as to comply with the surface shape of another material, when the obtained matte film or sheet is laminated with another material, easily follows the shape of a roughened shape such as an embossed shape, and consequently is superior in workability.

When the film or sheet is formed by drawing, the drawing ratio is preferably set so that the thickness of the final film or sheet is in a range of 1/500 to 1/40 with respect to a gap of a mouthpiece (die lip), regardless of a drawing method, and the film or sheet is preferably formed by a melting and drawing method or a cold-drawing method at least in an uniaxial direction.

When the film or sheet is formed by the cold-drawing method, and particularly by reheating a material which has been obtained by melting the raw material, quenching it from a molten state and solidifying it in an almost amorphous state (referred to as a parison in the present invention), and then cold-drawing it, it is preferable to draw the polylactic acid resin in the molten state at least in an uniaxial direction with an extrusion method so that the thickness of the parison is in a range of 1/2 to 1/20 times with respect to a gap of the mouthpiece (die lip), and the area is expanded into 2 to 20 times that of the parison; and then cold-draw it into 1.5-6 times of original length in each direction of the MD direction (longitudinal direction of film) and the TD direction (transverse direction of film) of the parison. Specifically, it is preferable to draw the raw material at least in the uniaxial direction so that the oriented film or sheet has finally the thickness in a range of 1/200 to 1/40 times with respect to the gap of the die lip, and so that the oriented film or sheet has finally the area expanded into a range of 40 to 200 times of that after having left a die outlet.

In addition, when the film or sheet is heat-treated into an unshrinkable film or sheet, the heat treatment temperature is preferably about 80 to 160° C. and the heat treatment period of time is in a range of 2 to 10 seconds. When the condition is lower than the range, the obtained film has a high thermal shrinkage rate and hardly becomes the unshrinkable film; and when the condition exceeds the range, the film may be melted during the heat treatment and be ruptured.

The thickness of the matte film or sheet of the present invention is preferably 5 to 500 µm, more preferably 7 to 250 µm, and further preferably 10 to 100 µm. When the matte film or sheet is thermally laminated with another material having surface roughness such as an embossed pattern, and the thermally laminated product is further subjected to the treatment of imparting the rough surface shape such as an embossed pattern, the matte film or sheet is preferably as thin as possible in such a range as to keep the strength into a handleable range and maintain the function of the matte surface, and specifically has a thickness of preferably 20 μm or thinner and further preferably 15 μm or thinner, so that the rough geometry is copied as closely as possible.

It is a preferable method for the purpose of obtaining a thin film when manufacturing the matte film or sheet of the present invention, to co-extrude the raw material of the film and a resin nonadhesive to the film through a multi-layer die, and then removing the nonadhesive resin layer to obtain an objective film, because the method improves film-forming stability by using the nonadhesive resin.

The nonadhesive resin layer may contact with only one surface of the matte film or sheet of the present invention, or with both surfaces. In addition, at least one layer of the nonadhesive resin is preferably used, and two or less layers may be used.

In general, resins tend to have adequate compatibility between them when they have almost the same solubility parameter value (SP value), tend to be mixed with each other when they are blended, and tend to adhere to each other contacting resin layer when co-extruded for forming the film. Accordingly when selecting the nonadhesive resin, it is recommended to select the nonadhesive resin having as much different from the other contacting resin layer in a chemical structure (primary structure) and polarity as possible. Then, the resins have much difference between them in the solubility parameter value, and the combination of the selected resin layers keeps nonadhesiveness when they are co-extruded for forming the film. For example, many biodegradable resins such as a polylactic acid resin have an aliphatic polyester structure as a main structure, and have a group with a comparatively high polarity such as a carbonyl group, so that a nonpolar resin with such as polyolefin has a tendency to hardly adhere to the aliphatic polyester resin, and is one of the adequate nonadhesive resins. A measure of nonadhesiveness is a degree of nonadhesiveness in which the objective film or sheet is peeled off without being deformed when being peeled off from the nonadhesive resin layer after the film has been formed. A resin which is nonadhesive to the matte film or sheet of the present invention is not limited in particular as long as the resin is nonadhesive and has excellent film-forming stability, but is preferably a polyolefin resin such as polyethylene and polypropylene.

The matte film or sheet of the present invention can be blended as needed, with an additive which is usually used in the art such as a filler, an antioxidant, a thermostabilizer, a hydrolysis inhibitor, an UV absorber, a lubricant, an antistatic agent, a flame retardant, a nucleating agent, a crosslinking agent, a coloring agent, an antifungus agent and a moldproofing agent, in such an extent as not to impair the requirement and characteristics of the present invention.

A filler is a material added to a resin generally in the field of a synthetic resin for the purpose of improving the properties such as strength and durability, and includes an oxide of a metal such as magnesium, calcium, barium, zinc, zirconium, molybdenum, silicon, antimony and titanium; a hydrate (hydroxide) of the oxide; a compound such as sulfate, carbonate and silicate of the metal; a double salt thereof; and a mixture thereof. Specific examples include aluminum oxide (alumina), hydrate thereof, calcium hydroxide, magnesium oxide (magnesia), magnesium hydroxide, zinc oxide (zinc flower), an oxide of lead such as red lead and white lead, sodium carbonate, sodium hydrogen carbonate, magnesium carbonate, calcium carbonate, basic magnesium carbonate, white carbon, mica, talc, glass fiber, glass powder, glass bead, clay, diatomaceous earth, silica, wollastonite, iron oxide, antimony oxide, titanium oxide (titania), lithopone, ground pumice, aluminum sulfate (gypsum or the like), zirconium silicate, barium carbonate, dolomite, molybdenum disulfide and iron sand.

An antioxidant includes a hindered phenolic antioxidant such as p-t-butylhydroxytoluene and p-t-butylhydroxyanisol; and a thermostabilizer includes triphenyl phosphite, trilauryl phosphite and trisnonylphenyl phosphite. In addition, a hydrolysis inhibitor includes a carbodiimide compound and an isocyanate compound, but preferably is the carbodiimide compound. An UV absorber includes p-t-butylphenyl salicylate, 2-hydroxy-4-methoxybenzophenone, 2-hydroxy-4-methoxy-2'-carboxybenzophenone and 2,4,5-trihydroxybutyrophenone; a lubricant includes calcium stearate, zinc stearate, barium stearate and sodium palmitate; an antistatic agent includes N,N-bis(hydroxyethyl)alkylamine, alkylamine, alkylallyl sulfonate and alkyl sulfonate; a flame retardant includes hexabromocyclododecane, tris-(2,3-dichloro propyl)phosphate, penbromo phenylaryl ether; and a nucleating agent includes polyethylene terephthalate, poly-transcyclohexanedimethanol terephthalate and palmiticamide.

The matte film or sheet of the present invention includes not only a single-layer film or sheet, but also a multilayer film or sheet with a structure having the matte film or sheet of the present invention stacked thereon so that a surface gloss (45° gloss) of at least one external surface is 60% or less. Particularly, among the multilayer films or sheets, a preferred multilayer film or sheet has the matte film or sheet layer of the present invention on at least one external surface; and has a layer for improving workability such as film-forming stability of the film or sheet, and/or a layer for improving a physical property such as a layer for imparting flexibility and a layer for improving adhesiveness to another substrate, for other layers. A further preferred multilayer film or sheet has the matte film or sheet layer of the present invention on at least one external surface; and has a layer for improving workability such as film-forming stability of the film or sheet, and/or a layer for improving a physical property such as a layer for imparting flexibility and a layer for improving adhesiveness to another substrate, which are made from a biodegradable resin, for other layers.

In addition, the matte film or sheet of the present invention may be a single material or a composite material having a different or the same material stacked on the single material. The matte film or sheet can be further hydrophilized by corona treatment or the like, so as to fit for printing, coating, laminating or the like. The surface tension after having been hydrophilized is preferably in a range of 40 mN/m to 60 mN/m.

An application used as a single material includes a package material which directly uses the film or sheet of the present invention in package for adding a quality appearance to an article to be packaged; and an agricultural material such as a cultivation house and a mulch film. In addition, a field of use as a composite material laminated with the other material includes: a field of use as an antifouling film for wall paper, which is stacked on a wall paper surface as the antifouling film for wall paper, and does not impair matte properties of the wall paper; a field of use for being stacked on the surface of a screen which dislikes stray light; a field of use for preventing the stain of an interior decoration such as a house furnishing, a furniture and a curtain, and for adding matte properties and the quality appearance to them by being stacked on their surfaces; a field of use for adding matte properties and a similar quality appearance to a leather product to a commodity, a school supply, a stationery and a notebook, by being stacked on their surfaces; and a field of use as a film for adding the quality appearance due to the matte properties to a paper product, a paper vessel, a fabric article, a textile product or a tablecloth, and imparting a water-proof effect to paper, a cloth and a fiber, by being stacked on their surfaces.

In the next place, the present invention will be specifically described with reference to examples and Comparative Examples.

An evaluation method used in Examples and Comparative Examples will be now described below.

(1) Optical Purity OP of Polylactic Acid Resin (A)

The optical purity (OP: in unit of %) of a polylactic acid resin (A) is calculated, as was described earlier, from a composition ratio by monomer unit of composing L-lactic acid and/or a D-lactic acid, through the following expression:

OP=|[L]−[D]|, wherein [L]+[D]=100.

The composition ratio by monomer unit of L-lactic acid and/or D-lactic acid, which compose the polylactic acid resin (A), was measured and determined by the steps of: preparing a hydrolyzed sample (liquid) by alkaline-fissioning a sample in an 1N solution of NaOH, neutralizing it in an 1N solution of HCl, and adjusting the concentration with distilled water; measuring the amount of L-lactic acid and D-lactic acid contained in the hydrolyzed sample on a measurement condition described below by irradiating it with an ultraviolet light of 254 nm, while using a high performance liquid chromatography (HPLC: LC-10A-VP) made by Shimadzu Corporation, which has an optical isomer separation column mounted therein; determining a weight ratio [L] (unit:%) of L-lactic acid which composes the polylactic acid polymer (A) and a weight ratio [D] (unit:%) of D-lactic acid which composes the polylactic acid polymer (A) from the ratio of detected peak areas of L-lactic acid and D-lactic acid (of which the area was measured by a perpendiculars method); and calculating an arithmetic mean value (rounded-off) of three points per one polymer.

column: "TSKgel-Enantio-L1" made by Tosoh (trade name) (with diameter of 4.6 mm and length of 25 cm)
    migration phase: 1 mM-CuSO$_4$ aqueous solution
    concentration of sample solution: 25 pg/µL (concentration of polylactic acid polymer)
    quantity of injected sample solution: 10 µL
    flow rate of solvent: 0.5 to 0.8 ml/minute
    column temperature: 40° C.

(2) Weight Average Molecular Weight Mw of Polylactic Acid Resin (A)

The weight average molecular weight Mw of polylactic acid resin (A) was measured and determined by the steps of: measuring the weight average molecular weight Mw as an average value of dispersed weights of macromolecule substances except substances having a molecular weight of 500 or less in terms of polystyrene standard, by using a gel permeation chromatography device made by Tosoh (GPC: data processing unit of GPC-8020 and detecting element of RI-8020), and polystyrene standards on a measurement condition described below; and calculating an arithmetic mean (with a significant figure of two) of three points per one sample.

column: coupled column (diameter of 7.8 mm and length of 60 cm) of "Shodex K-805" (trade name) made by Showa Denko and "Shodex K 801" (trade name)
    eluent: chloroform
    concentration of sample solution: 0.2 wt/vol %
    quantity of injected sample solution: 200 µL
    flow rate of solvent: 1 ml/minute
    temperature of column and detector: 40° C.

(3) Melting Point Tm and Glass Transition Temperature Tg of Polylactic Acid Resin (A), Starch Derivative (b), BIONOLLE #3001 (Trade Name, Showa Highpolymer Co., Ltd.) and Ecoflex (Trade Name, BASF AG)

A melting point Tm and a glass transition temperature Tg of a resin were measured in accordance with JIS-K7121. Specifically, the melting point Tm (° C.) was measured and determined by the steps of: adjusting the condition of a sample (leaving it at 23° C. for one week) in a standard condition (23° C. and 65% RH); cutting out about 10 mg of test pieces from two points (two spots) each in a longitudinal direction (MD) and the transverse direction (TD); then, placing the test piece in a differential scanning calorimeter (heat flow rate type DSC), DSC-7 type, made by Perkin-Elmer Corporation; heating it to 200° C. from a room temperature (23° C.) at 10° C./minute (primary heating) in a nitrogen gas with a flow rate of 25 ml/minute, and holding it at 200° C. for 10 minutes to completely melt it; then cooling it to −100° C. at 30° C./minute, and holding it at −100° C. for two minutes; further heating it for a second time (second heating) on the above described heating condition to draw a DSC curve; measuring the melting point Tm (° C.) from the peak top of a melting (endotherm) curve in primary heating among the peak tops in the DSC curve; and calculating an arithmetic mean value (in which the number of the decimal places was rounded off) of four points per one sample. The Tg (unit: ° C.) was measured and determined by the steps of: determining an intersection point (intermediate point glass transition temperature) of a stepwise-changing partial curve in second heating among the curves in the DSC curve, and a straight line equidistance in a vertical axis direction from an extended line of each baseline; and calculating an arithmetic mean value (in which the number of the decimal places was rounded off) of four points per one sample.

(4) Thickness of Overall Layers and Thickness of Each Layer (µm) in the Film or Sheet A thickness of overall layers of the film was measured with the use of a micrometer in accordance with JIS-K-7130, and the thickness of each layer was measured by observing a cross-section of a multilayer film with a microscope.

(5) Average of Cross-Sectional Areas of Larger First 20% Domains when the Cross-Sectional Areas are Count Down Among all Domains of Chemically Modified Starch (B) in TD Cross-Section of Film or Sheet A microscopic examination sample for a TD cross-section as is shown in FIG. 1 was prepared by the steps of: adjusting a condition of a sample film or sheet (leaving it at 23° C. for one week) in a standard condition (23° C. and 65% RH); cutting out samples from three spots at an equal distance in the transverse direction (TD direction shown in FIG. 1); then double staining them by osmium tetroxide and ruthenium tetroxide; embedding them in an epoxy resin; and then cutting out the ultrathinly sliced piece with 0.1 to 1 µm thick along a TD direction of the film or sheet, which is a direction perpendicular to the surface of the film (namely, in thickness direction), by using an ultramicrotome LKB2088. In the same way, a microscopic examination material for the MD cross-section was prepared. Subsequently, the obtained microscopic examination sample was observed with the use of a transmission electron microscope (TEM) H7100 type made by Hitachi, Ltd., and was taken a photograph with the magnification of 40,000 times. Then, dimensions and cross-sectional areas were measured on all domains of the dyed chemically modified starch (B) appearing in the photograph.

Figure 8:
FIG. 8 is a photograph taken with a transmission electron microscope for a TD cross-section of a film in Example A37.

The cross-section area of a domain was measured by the steps of: determining a TD cross-section area of the domain of a chemically modified starch (B) in an electron microscope photograph one by one with the use of Image-Pro Version 4.0 (trade name) made by MEDIA CYBERNETICS Corporation; arranging them in order of decreasing TD cross-sectional areas; selecting larger first 20% domains when the cross-sectional areas are count down among the domains that appeared in the photograph; and calculating an average of the selected cross-sectional areas. For instance, when the number of the domains of the chemically modified starch (B) appearing in the photograph of the TD cross-section was 100, the average value was determined by the steps of: selecting 20 domains from the largest to 20th large domain when the cross-sectional areas are count down among the domains in the TD cross-section; and dividing the total of the selected cross-sectional areas by 20. In the above steps, a joined domain was divided into several domains in a rational border which was estimated from the outline of each domain, when domains close to each other show a joined shape in the photograph by an electron microscope, though the cross-section area of each domain is not large, for instance, as is shown in FIG. 8, which occasionally occurs when a content of the chemically modified starch (B) was high; and the cross-section area of each domain was determined.

(6) Average Particle Size (μm) of Particulate Polymer (D) and Inorganic Filler (F)

An average particle size of a particulate polymer (D) and an inorganic filler (F) was determined by measuring the size with the use of a laser diffraction/scattering type particle size distribution measuring device LA-910 (trade name) made by Horiba, Ltd. Corporation; and calculating a particle size when a cumulative total of frequencies of smaller particle sizes reached 50%.

(7) Surface Gloss (45° Gloss) (%)

A measured value of surface gloss was determined by the steps of: adjusting a condition of a sample film or sheet (leaving it at 23° C. for one week) in a standard condition (23° C. and 65% RH); cutting out a square sample with 50 mm square per side as a test piece from the sample film or sheet; then measuring the surface gloss (Gloss: in unit of %) of the test piece in accordance with ASTM-D2457-70, by using a glossmeter VGS-300A (trade name) made by Nippon Denshoku Kogyo, in a normal state; and calculating an arithmetic mean value (with a significant figure of two) of six points per one film or sheet.

(8) Matte Properties

Matte properties were evaluated in the following way, from the viewpoint of the shininess of an article to be packaged when packaged by using a film or sheet into a package body.

aa: having highest matte properties and showing minimal shininess a: showing shininess controlled into considerably low level and having adequate level of matte properties b: showing shininess controlled to medium level and having medium level of matte properties c: showing shininess controlled to some extent and having minimum level of matte properties for practical use x: having inferior matte properties and reflecting shinny light (9) Film-Forming Stability Film-forming stability means the stability when a film is formed and was evaluated according to the following criteria.

aa: film is stably formed with no problem a: film is almost stably formed with few problems b: film seldom has fragile part and occasionally becomes rid of air in film when tube-shaped film is formed c: film sometimes has fragile part and occasionally becomes rid of air in it when tube-shaped film is formed x: film is fragile, becomes rid of air in it when tube-shaped film is formed in many cases, and hardly provides film free from defect continuously

(10) Roughness Transferability and Adhesiveness

Roughness transferability of the film from an emboss roll and adhesiveness between a substrate (polyvinyl chloride resin) and a sample film were evaluated on a laminate prepared by compression bonding a sample film with a wall paper of a polyvinyl chloride resin preheated to 170° C. through a heat roll (roll for contacting with the back surface of the paper made from the polyvinyl chloride resin) heated to 160° C. and a cold embossing roll (roll for contacting with a sample film) of 30° C., according to the following criteria.

aa: having best roughness transferability, showing most beautifully embossed pattern, and having adequate adhesiveness with substrate a: having adequate roughness transferability and adequate adhesiveness with substrate, and showing beautiful appearance b: having either adequate roughness transferability or adhesiveness with substrate, while the other is in the lowest level for accepting practical use c: both of roughness transferability and adhesiveness to substrate are in the lowest level for accepting practical use x: at least one of roughness transferability and adhesiveness to substrate is in unacceptable level for practical use

(11) Blocking Property

Blocking properties were evaluated according to the following criteria.

aa: no problem of blocking a: causing almost no problem but a little resistance when unwinding film in some rare cases b: causing a little resistance when unwinding film in some cases c: causing blocking when unwinding film in some cases but having lowest level of being acceptable in practical use x: causing blocking when unwinding film frequently, and needing force causing deformation (extension) of film for unwinding it

(12) Antifouling Test

An antifouling test was carried out in accordance with a method mentioned in a homepage of Wallcoverings Association of Japan, in order to examine an antifouling function (stain resistance) of the laminate when the film or sheet is laminated with wall paper, by the steps of: attaching contaminants (coffee, soy sauce, crayon and aqueous felt pen) on the film; leaving them for 24 hours; wiping the contaminants of the coffee and the soy sauce with water, and the contaminants of the crayon and the aqueous felt pen with a neutral detergent; and evaluating the result through visual observation. A part from which the contaminant had been wiped was visually observed in comparison with the original film, and was estimated to which grade in rating scales of 1 to 5 the result corresponds, and a grade 4 or higher was considered to be acceptable.

Grade 5: no contaminant left

Grade 4: almost no contaminant left

Grade 3: a little contaminant left

Grade 2: quite a bit of contaminant left

Grade 1: much contaminant left

(13) Overall Assessment

The evaluation results on four items of matte properties, film-forming stability, roughness followability and adhesiveness, and blocking properties were subjected to overall assessment according to the following criteria.

AA: evaluated as (aa) on all of four items and being best matte film or sheet

A: evaluated as (a) on one or more items among evaluations for four items and (aa) on the rest, and being excellent matte film or sheet B: evaluated as (b) on one or more items among evaluations for four items and (aa) or (a) on the rest, and being satisfactory matte film or sheet C: evaluated as (c) on one or more items among evaluations for four items, and as (aa), (a) or (b) on the rest, and being matte film or sheet with lowest level of being acceptable for practical use x: evaluated as x on one or more items among evaluations for four items, and being unacceptable matte film or sheet for practical use First, an example of a matte film of the present invention consisting of a polylactic acid resin, chemically modified starch and a plasticizer will be now described.

A polylactic acid resin used in the following examples and Comparative Examples were crystalline polylactic acid (a1) and (a2) and amorphous polylactic acid (a3), which were prepared by polymerizing a monomer while controlling an amount of a catalyst, a polymerization condition and a composition of the monomer according to a method described in Examples 1B to 7B of JP-A-4-504731, and had a weight average molecular weight, optical purity, Tg and Tm shown in Table 1. In addition, the chemically modified starch (B) employed esterified starches Cornpol CP-1, CP-3, CP-5 and CP-7 (all trade names) made by Nihon Cornstarch Corporation, as a starch derivative (b). In addition, the plasticizer (C) employed ATBC (acetyl tributyl citrate) made by Nissei Chemical Industry Co., Ltd., as a polyhydroxycarboxylic acid ester, and Rikemal PL-009 and PL-019 (both of which are trade names) made by Riken Vitamin Corporation, as glycerin acetic ester. In addition, Examples A48 to A50, A53 and A56 employed BIONOLLE #3001 (trade name) made by Showa Highpolymer Co., Ltd. in the second layer of a three-layer film, and Ecoflex (trade name) made by BASF AG to be blended with polylactic acid. In addition, Examples A53, A54 and A56 employed a silicone resin particle KMP-590 (trade name) made by Shin-Etsu Chemical Co., Ltd. as a particulate polymer (D), and Examples A52, A54 and A55 employed Suntech LDF-1920 (trade name) made by Asahi Kasei Chemicals Corporation, as a nonadhesive resin. However, a composition of the resin of the present invention is not limited by those.

EXAMPLES A1 TO A39 AND COMPARATIVE EXAMPLES A1 TO A5

In Examples A1 to A39 and Comparative Examples A1 to A5, raw pellets were prepared by using crystalline polylactic acid (a1) and (a2), and amorphous polylactic acid (a3); esterified starches Cornpol CP-1, CP-3, CP-5 and CP-7 made by Nihon Cornstarch Corporation, Ltd. as a chemically modified starch (B); and ATBC, Rikemal PL-009 and PL-019 as a plasticizer (C), which are all described in Table 1: and by compounding them in such a way as will be described below. Specifically, the compound pellet of polylactic acid containing 25% of a chemically modified starch was prepared by the steps of: dry-blending 75 wt % of polylactic acid and 25 wt % of the chemically modified starch; and then melting and blending the mixture with the use of a co-rotating twin screw extruder. In the same way, a compound pellet of polylactic acid containing 50% of the chemically modified starch was prepared from 50 wt % of polylactic acid and 50 wt % of the chemically modified starch. In addition, a compound pellet of polylactic acid containing 10% of a plasticizer was prepared by adding 10 wt % of the plasticizer into 90 wt % of polylactic acid and mixing them through the co-rotating twin screw extruder.

Subsequently, single-layer films described in Tables 2 to 5 were formed by the steps of: dry-blending pellets containing a chemically modified starch, plasticizer-containing pellets and polylactic acid pellets (a1), (a2) and (a3) prepared in the method as was described above, so as to form a composition described in Tables 2 to 5; extruding the blend through a circular single-layer die. In addition, films having a composition containing 8% or more of a plasticizer described in Tables 2 to 5 were formed by the steps of: charging polylactic acid, the chemically modified starch and the plasticizer into a co-rotating twin screw extruder; melting and blending the above blend to prepare each raw compound pellet of polylactic acid having the same composition as the film composition described in Tables 2 to 5; and forming the raw pellets into the films.

When the pellet was extruded, it was formed into a film by the steps of: extruding the pellet into a tubular form of a melt resin, with the use of a circular die having an outside die lip with the diameter of 110 millimeters, an inside die lip with the diameter of 108 millimeters and the lip clearance of 1.0 millimeter, and having a die temperature set at 160° C.; and introducing air into the tube while cooling the tube with the air of about 25° C. from a cooling ring, to form bubbles therein; guiding the obtained film to a pinch roll; and winding up the film in the tube form as the two flat films. The film with a final thickness of 15 µm was formed by subsequently fine-tuning a resin-extruded rate, a quantity of air injected into the bubbles and a film-winding rate by the pinch roll, after the bubbles became stable.

Evaluation results for physical properties of films formed in Examples A1 to A39 and Comparative Examples A1 to A5 are shown in Tables 2 to 5.

EXAMPLES A40 TO A51

In Examples A40 to A43, Example A49 and Example A51, films consisting of three layers and two compositions having a final overall thickness of 13 µm were formed by the steps of: dry-blending a compound pellet of polylactic acid obtained in the same method as in Examples A1 to A39, and pellets (a1), (a2) and (a3) of 100% polylactic acid so as to form a composition shown in Table 6 and extruding the blend, for the first layer (outermost layer) and the third layer (innermost layer); and dry-blending a compound pellet of polylactic acid containing 10% of a plasticizer obtained in the same method as in Examples A1 to A39, a polylactic acid pellet, and a pellet of BIONOLLE #3001 (polybutylene succinate adipate made by Showa Highpolymer Co., Ltd.) so as to form a composition shown in Table 6 and extruding the blend, for the second layer (intermediate layer), while using a three-layer circular die having an outside die lip with the diameter of 110 millimeters, an inside die lip with the diameter of 108 millimeters and the lip clearance of 1.0 millimeter, and having a die temperature set at 160° C. In addition, in Examples A44 to A48, films consisting of three layers and two compositions having a final overall thickness of 13 μm were formed by the steps of: charging polylactic acid, a chemically modified starch and a plasticizer into a co-rotating twin screw extruder, and melting and blending them to prepare raw compound pellets of polylactic acid having the same compositions as each of the first layer (outermost layer) and the third layer (innermost layer) described in Table 6; and dry-blending a compound pellet of polylactic acid containing 10% of a plasticizer obtained in the same method as in Examples A1 to A39, a polylactic acid pellet, and a pellet of Ecoflex (biodegradable aliphatic aromatic copolyester made by BASF AG) so as to form a composition shown in Table 6 and extruding the blend, for the second layer (intermediate layer). In addition, in Example A50, a film consisting of two layers and two compositions having a final overall thickness of 13 μm was formed by extruding the blend of resins having the same compositions of the first layer and the second layer in Example A49 so as to form each layer into each thickness shown in Table 6, through a two-layer circular die having an outside die lip with the diameter of 110 millimeters, an inside die lip with the diameter of 108 millimeters and the lip clearance of 1.0 millimeter. Evaluation results for physical properties of films formed in Examples A40 to A51 are shown in Table 6. Among the above results, the value of gloss (%) in Example A50 is the value of surface gloss (%) measured on the first layer side, and roughness transferability and adhesiveness were values evaluated after having had brought the second layer side into close contact with a wall paper made from a polyvinyl chloride resin, and thermo-compression-bonded them so that the first layer side appeared to the outside.

Table 7 shows an average of cross-sectional areas of larger first 20% domains when the cross-sectional areas are count down among all the domains of a chemically modified starch (B) in a TD cross-section of the film obtained in Examples A1, A7, A13, A18, A24, A36 and A37, and in the TD cross-section of the first layer in Example A49, and a value of gloss (%) of each of the films. In addition, FIGS. 2 to 8 show electron microscope photographs of the TD cross-sections and MD cross-sections of Examples A1, A18, A24, A36 and A37 among those films. It is understood that films with adequate matte properties have a higher average value of the TD cross-sectional areas of the domains of the chemically modified starch (B) than that of films inferior in the matte properties.

Table 8 shows the results of antifouling tests on films obtained in Examples A1, A11, A14, A18, A40 to A45 and A48 to A50. Among the results, the antifouling test in Example A50 was carried out on the surface of the first layer side. It is understood that the film of the present invention is superior in antifouling properties.

EXAMPLES A52 TO A56 AND COMPARATIVE EXAMPLE A6

In Examples A52 to A56, a silicone resin particle of KMP-590 (trade name) was employed as a particulate polymer (D), and Suntech LD F-1920 (trade name) as a nonadhesive resin. The particulate polymer (D) was used as a 10% masterbatch which was prepared by melting and blending 10 wt % of the silicone resin particles with 90 wt % of polylactic acid with the use of co-rotating twin screw extruder.

Multilayer films with predetermined thicknesses were formed by the steps of: employing compound pellets of polylactic acid obtained by being melt and blended with the use of a co-rotating twin screw extruder in the same method as in Examples A1 to A39 so as to form a composition shown in Table 9, and a masterbatch of the above described particulate polymer (D), for the first layer (outermost layer of tube film); employing such a dry-blend of polylactic acid and BIONOLLE #3001 or Ecoflex, or each single material as to form the composition shown in Table 9, for the second layer (intermediate layer); employing Suntech LD F-1920 of low-density polyethylene which is a nonadhesive resin, for a resin in the second layer of Examples A52, A54 and A55, Ecoflex in Example A53, and BIONOLLE #3001 in Example A56, for the third layer (innermost layer of tube film); and extruding them by using a three-layer circular die having an outside die lip with the diameter of 110 millimeters, an inside die lip with the diameter of 108 millimeters and the lip clearance of 1.0 millimeter, and having a die temperature set at 160° C. However, the objective films in Examples A52, A54 and A55 were obtained by peeling off the low-density polyethylene layer of the nonadhesive resin layer from the other two layers, after the three-layer films were formed, and the physical properties were evaluated on them.

In addition, in Comparative Example A6, a film consisting of two layers and two compositions with a thickness of 10 μm was tried to be formed, so as to directly obtain a film with the same composition, the same film structure and the same thickness as those of the film obtained by having had removed a nonadhesive resin layer from the three-layer film of Example A55, by the steps of: preparing a raw material of the first layer and the second layer so as to form a composition shown in Table 9 in the same method as in Examples A52 to A56; and extruding them by using a two-layer circular die having an outside die lip with the diameter of 110 millimeters, an inside die lip with the diameter of 108 millimeters and the lip clearance of 1.0 millimeter, and having a die temperature set at 160° C.: but a continuous film was not obtained because film-forming stability deteriorated, and a fragmentally formed film was subjected to the evaluation for physical properties.

Evaluation results for physical properties of thus obtained films are shown in Table 9. In the table, the value of gloss (%) is a value of surface gloss (%) measured on the first layer side; the matte properties was evaluated also in the first layer side; and roughness transferability and adhesiveness were evaluated on a sample prepared by bringing a wall paper made from a polyvinyl chloride resin into close contact with third layer sides of Examples A53 and A56, and with second layer sides of Examples A52, A54 and A55 and Comparative Example A6; and thermo-compression-bonding them so that the first layer side appears to the outside.

Table 10 shows the result of antifouling tests on films obtained in Examples A52 to A56. In the table, the antifouling tests for Examples A52 to A56 were carried out on the surface of the first layer side. It is understood that the film of the present invention is superior in antifouling properties as well. It is also understood that the film containing a particulate polymer of a silicon resin in Examples A53, A54 and A56 is further superior in the antifouling properties to those of the film containing no particulate polymer in Examples A52 and A55.

TABLE 1

|  | Weight average molecular weight | D-lactic acid content | Optical purity | Tg | Tm | Remarks |
|---|---|---|---|---|---|---|
| Polylactic acid resin (A) | | | | | | |
| Crystalline polylactic acid (a1) | 230,000 | 1.1% | 98% | 56° C. | 172° C. | |
| Crystalline polylactic acid (a2) | 240,000 | 4.0% | 92% | 54° C. | 158° C. | |
| Crystalline polylactic acid (a3) | 250,000 | 13.0% | 74% | 54° C. | None | |
| Chemically modified starch (B) | | | | | | |
| Cornpol CP-1 (esterified starch) | | | | | 169° C. | |
| Cornpol CP-3 (esterified starch) | | | | | 120-137° C. | Product of Nihon Cornstarch Corporation |
| Cornpol CP-5 (esterified starch) | | | | | 105-115° C. | Product of Nihon Cornstarch Corporation |
| Cornpol CP-7 (esterified starch) | | | | | 97° C. | Product of Nihon Cornstarch Corporation |
| Plasticizer (C) | | | | | | |
| ATBC (acetyl tributyl citrate) | | | | | | Product of Nissei Chemical Industry Co., Ltd. |
| PL-009 (glycerin diacetomonocaprylate) | | | | | | Product of Riken Vitamin Co., Ltd. |
| PL-019 (glycerin diacetomonocaprate) | | | | | | Product of Riken Vitamin Co., Ltd. |
| Resin for second layer of multilayer film | | | | | | |
| BIONOLLE #3001 (Polybutylene succinate adipate) | | | | −45° C. | 95° C. | Product of Showa Highpolymer Co., Ltd. |
| Ecoflex (Biodegradable aliphatic-aromatic copolyester) | | | | −30° C. | 110° C. | Product of BASF AG |

|  | Average particle size | D-lactic acid content | Optical purity | Tg | Tm | Remarks |
|---|---|---|---|---|---|---|
| Particulate polymer (D) | | | | | | |
| KMP-590 (silicone resin) | 1.5 μm | | | | | Product of Shin-Etsu Chemical Co., Ltd. |
| Nonadhesive resin | | | | | | |
| Suntec LD F-1920 (low density polyethylene) | | | | | | Product of Asahi Kasei Chemicals Corporation |

TABLE 2

|  | Example A1 | Example A2 | Example A3 | Example A4 | Example A5 | Example A6 | Example A7 | Example A8 | Example A9 | Example A10 | Example A11 |
|---|---|---|---|---|---|---|---|---|---|---|---|
| Raw material composition (wt %) | | | | | | | | | | | |
| Crystalline polylactic acid (a1) | | | | | 57 | 81 | 79 | 54 | 52 | | |
| Crystalline polylactic acid (a2) | 80 | 78 | 76 | 74 | | | | | | 80 | 84 |
| Crystalline polylactic acid (a3) | | | | | 14 | | | 23 | 23 | | |
| Cornpol CP-3 | 10 | 12 | 14 | 16 | 19 | 11 | 13 | 15 | 17 | 13 | 10 |
| Cornpol CP-5 | | | | | | | | | | | |
| Cornpol CP-7 | | | | | | | | | | | |
| ATBC | 10 | 10 | 10 | 10 | 10 | 8 | 8 | 8 | 8 | 7 | 6 |
| PL-009 | | | | | | | | | | | |
| Total | 100 | 100 | 100 | 100 | 100 | 100 | 100 | 100 | 100 | 100 | 100 |

TABLE 2-continued

|  | Example A1 | Example A2 | Example A3 | Example A4 | Example A5 | Example A6 | Example A7 | Example A8 | Example A9 | Example A10 | Example A11 |
|---|---|---|---|---|---|---|---|---|---|---|---|
| Tg (° C.) of Cornpol | 125 | 125 | 125 | 125 | 125 | 130 | 130 | 130 | 130 | 131 | 131 |
| Surface gloss (gloss: %) | 7 | 6 | 5 | 4 | 4 | 6 | 5 | 4 | 4 | 4 | 10 |
| Matte properties | aa | aa | aa | aa | aa | aa | aa | aa | aa | aa | aa |
| Film-forming stability | aa | aa | aa | aa | aa | aa | aa | aa | aa | aa | aa |
| Roughness transferability and adhesiveness | aa | aa | aa | aa | aa | aa | aa | aa | aa | aa | aa |
| Blocking | aa | aa | aa | aa | aa | aa | aa | aa | aa | aa | aa |
| Overall assessment | AA | AA | AA | AA | AA | AA | AA | AA | AA | AA | AA |

TABLE 3

|  | Example A12 | Example A13 | Example A14 | Example A15 | Example A16 | Example A17 | Example A18 | Example A19 | Example A20 | Example A21 | Example A22 |
|---|---|---|---|---|---|---|---|---|---|---|---|
| Raw material composition (wt %) | | | | | | | | | | | |
| Crystalline polylactic acid (a1) | 82 | 54 | 78 | 54 | 36 | 36 | 36 | 36 | 36 | 27 | 75.5 |
| Crystalline polylactic acid (a2) |  | 16 |  | 11 | 40 | 38 | 36 | 34 | 40 | 47 |  |
| Crystalline polylactic acid (a3) |  | 10 |  | 11 | 9 | 9 | 9 | 9 | 8 | 12 |  |
| Cornpol CP-3 | 12 | 14 | 16 | 18 | 11 | 13 | 15 | 17 | 8 | 11 | 21 |
| Cornpol CP-5 |  |  |  |  |  |  |  |  |  |  |  |
| Cornpol CP-7 |  |  |  |  |  |  |  |  |  |  |  |
| ATBC | 6 | 6 | 6 | 6 | 4 | 4 | 4 | 4 | 8 | 3 | 3.5 |
| PL-009 |  |  |  |  |  |  |  |  |  |  |  |
| Total | 100 | 100 | 100 | 100 | 100 | 100 | 100 | 100 | 100 | 100 | 100 |
| Tg (° C.) of Cornpol | 131 | 131 | 131 | 131 | 128 | 128 | 128 | 128 | 122 | 122 | 122 |
| Surface gloss (gloss: %) | 6 | 5 | 4 | 4 | 9 | 4 | 4 | 4 | 11 | 11 | 6 |
| Matte properties | aa | aa | aa | aa | aa | aa | aa | aa | a | a | aa |
| Film-forming stability | aa | aa | aa | aa | aa | aa | aa | aa | aa | aa | a |
| Roughness transferability and adhesiveness | aa | aa | aa | aa | aa | aa | aa | aa | aa | a | a |
| Blocking | aa | aa | aa | aa | aa | aa | aa | aa | aa | aa | aa |
| Overall assessment | AA | AA | AA | AA | AA | AA | AA | AA | A | A | A |

TABLE 4

|  | Example A23 | Example A24 | Example A25 | Example A26 | Example A27 | Example A28 | Example A29 | Example A30 | Example A31 | Example A32 | Example A33 |
|---|---|---|---|---|---|---|---|---|---|---|---|
| Raw material composition (wt %) | | | | | | | | | | | |
| Crystalline polylactic acid (a1) | 27 | 37 | 22.5 | 22.5 |  | 18 | 20 | 50 | 50 |  |  |
| Crystalline polylactic acid (a2) | 40 | 40 | 53 | 50 | 78 | 58 | 61 | 24 | 17 | 70 | 50 |
| Crystalline polylactic acid (a3) | 10 | 10 | 13 | 12 |  |  |  | 5 | 5 | 19 | 12 |
| Cornpol CP-1 |  |  |  |  |  |  | 13 |  |  |  |  |
| Cornpol CP-3 | 12 | 5 | 9 | 13 | 20 | 22 |  | 8 | 15 | 3 | 28 |
| Cornpol CP-5 |  |  |  |  |  |  |  |  |  |  |  |
| Cornpol CP-7 |  |  |  |  |  |  |  |  |  |  |  |

TABLE 4-continued

|  | Example A23 | Example A24 | Example A25 | Example A26 | Example A27 | Example A28 | Example A29 | Example A30 | Example A31 | Example A32 | Example A33 |
|---|---|---|---|---|---|---|---|---|---|---|---|
| ATBC PL-009 | 11 | 8 | 2.5 | 2.5 | 2 | 2 | 6 | 13 | 13 | 8 | 10 |
| Total | 100 | 100 | 100 | 100 | 100 | 100 | 100 | 100 | 100 | 100 | 100 |
| Tg (° C.) of Cornpol | 122 | 120 | 120 | 125 | 127 | 127 | 169 | 130 | 130 | 130 | 130 |
| Surface gloss (gloss: %) | 7 | 29 | 19 | 8 | 6 | 5 | 5 | 17 | 6 | 37 | 5 |
| Matte properties | aa | b | a | aa | aa | aa | aa | a | aa | c | aa |
| Film-forming stability | aa | aa | aa | aa | b | b | b | aa | aa | aa | c |
| Roughness transferability and adhesiveness | aa | aa | b | b | b | b | b | aa | aa | aa | aa |
| Blocking | a | aa | aa | aa | aa | aa | aa | c | c | aa | aa |
| Overall assessment | A | B | B | B | B | B | B | C | C | C | C |

TABLE 5

|  | Example A34 | Example A35 | Example A36 | Example A37 | Example A38 | Example A39 | Comparative Example A1 | Comparative Example A2 | Comparative Example A3 | Comparative Example A4 | Comparative Example A5 |
|---|---|---|---|---|---|---|---|---|---|---|---|
| Raw material composition (wt %) | | | | | | | | | | | |
| Crystalline polylactic acid (a1) | 13.5 |  |  | 70 | 36 | 36 |  | 30 |  | 30 | 20 |
| Crystalline polylactic acid (a2) | 61 | 75.5 | 64 |  | 36 | 36 | 80 | 35 | 71 | 50 | 36 |
| Crystalline polylactic acid (a3) | 15 |  | 16 |  | 9 | 9 | 20 | 9 | 20 | 10 | 10 |
| Cornpol CP-3 | 9 | 23 | 10 |  |  |  |  | 9 | 1 | 10 | 32 |
| Cornpol CP-5 |  |  |  | 20 | 15 |  |  |  |  |  |  |
| Cornpol CP-7 |  |  |  |  |  | 15 |  |  |  |  |  |
| ATBC PL-009 | 1.5 | 1.5 | 10 | 10 | 4 | 4 |  | 17 | 8 |  | 2 |
| Total | 100 | 100 | 100 | 100 | 100 | 100 | 100 | 100 | 100 | 100 | 100 |
| Tg (° C.) of Cornpol | 130 | 130 | 125 | 107 | 107 | 97 | — | 128 | 128 | 128 | 128 |
| Surface gloss (gloss: %) | 25 | 5 | 55 | 56 | 57 | 60 | 110 | 15 | 65 | 52 | 4 |
| Matte properties | b | aa | c | c | c | c | x | a | x | c | aa |
| Film-forming stability | aa | c | aa | aa | aa | aa | aa | aa | aa | aa | x |
| Roughness transferability and adhesiveness | c | c | aa | aa | aa | aa | c | aa | aa | x | x |
| Blocking | aa | aa | aa | aa | aa | aa | aa | x | aa | aa | aa |
| Overall assessment | C | C | C | C | C | C | x | x | x | x | x |

TABLE 6

|  | Example A40 | Example A41 | Example A42 | Example A43 | Example A44 | Example A45 | Example A46 | Example A47 | Example A48 | Example A49 | Example A50 | Example A51 |
|---|---|---|---|---|---|---|---|---|---|---|---|---|
| Raw material composition (wt %) Composition of first layer and third layer | | | | | | | | | | | | |
| Crystalline polylactic acid (a1) | 36 | 36 | 54 | 78 | 79 | 54 |  |  | 79 | 36 | 36 | 36 |
| Crystalline polylactic acid (a2) | 36 | 34 | 16 |  |  |  | 80 | 78 |  | 36 | 36 | 36 |
| Crystalline polylactic acid (a3) | 9 | 9 | 10 |  |  | 23 |  |  |  | 9 | 9 | 9 |

TABLE 6-continued

|  | Example A40 | Example A41 | Example A42 | Example A43 | Example A44 | Example A45 | Example A46 | Example A47 | Example A48 | Example A49 | Example A50 | Example A51 |
|---|---|---|---|---|---|---|---|---|---|---|---|---|
| Cornpol CP-3 | 15 | 17 | 14 | 16 | 13 | 15 | 10 | 12 | 13 | 15 | 15 | |
| Cornpol CP-5 | | | | | | | | | | | | 15 |
| ATBC | 4 | 4 | 6 | 6 | 8 | 8 | 10 | 10 | 8 | 4 | 4 | 4 |
| Total | 100 | 100 | 100 | 100 | 100 | 100 | 100 | 100 | 100 | 100 | 100 | 100 |
| Tg (° C.) of Cornpol | 130 | 130 | 128 | 128 | 128 | 128 | 125 | 125 | 128 | 130 | 130 | 107 |
| Composition of second layer | | | | | | | | | | | | |
| Crystalline polylactic acid (a1) | 90 | 90 | | 90 | | 90 | | 90 | | | | 90 |
| Crystalline polylactic acid (a2) | | | 90 | | 90 | | 80 | | 75 | 75 | 75 | |
| Crystalline polylactic acid (a3) | | | | | | | 10 | | | | | |
| ATBC | | | 10 | | | | 10 | | | | | |
| PL-019 | 10 | 10 | | 10 | 10 | | | | | | | 10 |
| PL-009 | | | | | | 10 | | 10 | | | | |
| BIONOLLE #3001 | | | | | | | | | | 25 | 25 | |
| Ecoflex | | | | | | | | | 25 | | | |
| Total | 100 | 100 | 100 | 100 | 100 | 100 | 100 | 100 | 100 | 100 | 100 | 100 |
| Thickness of each layer (μm) | | | | | | | | | | | | |
| First layer | 4 | 4 | 4.5 | 4 | 4.5 | 5 | 5 | 4.5 | 4 | 4.5 | 5 | 4 |
| Second layer | 5 | 5 | 4 | 5 | 4 | 3 | 3 | 4 | 5 | 4 | 8 | 5 |
| Third layer | 4 | 4 | 4.5 | 4 | 4.5 | 5 | 5 | 4.5 | 4 | 4.5 | 0 | 4 |
| Total | 13 | 13 | 13 | 13 | 13 | 13 | 13 | 13 | 13 | 13 | 13 | 13 |
| Surface gloss (gloss: %) | 4 | 4 | 5 | 4 | 5 | 4 | 8 | 6 | 5 | 4 | 4 | 59 |
| Matte properties | aa | aa | aa | aa | aa | aa | aa | aa | aa | aa | aa | c |
| Film-forming stability | aa | aa | aa | aa | aa | aa | aa | aa | aa | aa | aa | aa |
| Roughness transferability and adhesiveness | aa | aa | aa | aa | aa | aa | aa | aa | aa | aa | aa | aa |
| Blocking | aa | aa | aa | aa | aa | aa | aa | aa | aa | aa | aa | aa |
| Overall assessment | AA | AA | AA | AA | AA | AA | AA | AA | AA | AA | AA | C |

TABLE 7

|  | Example A1 | Example A7 | Example A13 | Example A18 | Example A24 | Example A36 | Example A37 | Example A49 |
|---|---|---|---|---|---|---|---|---|
| Average of cross-sectional areas of larger first 20% domains among all the domains of chemically modified starch (B) in a TD cross-section of the film Unit: $nm^2$ (square nanometer) | 53,000 | 156,000 | 357,000 | 527,000 | 30,000 | 15,000 | 18,000 | 515,000 |
| Surface gloss (gloss: %) | 7 | 5 | 5 | 4 | 29 | 55 | 56 | 4 |

TABLE 8

| Example No. | | | | | | | | | | | | | |
|---|---|---|---|---|---|---|---|---|---|---|---|---|---|
|  | A1 | A11 | A14 | A18 | A40 | A41 | A42 | A43 | A44 | A45 | A48 | A49 | A50 |
| Antifouling property test | | | | | | | | | | | | | |
| Coffee | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Crayon | Grade 4 | Grade 4 | Grade 4 | Grade 4 | Grade 4 | Grade 4 | Grade 4 | Grade 4 | Grade 4 | Grade 4 | Grade 4 | Grade 4 | Grade 4 |
| Soy sauce | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Paint stick | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |

TABLE 9

|  | Example A52 | Example A53 | Example A54 | Example A55 | Example A56 | Comparative Example A6 |
|---|---|---|---|---|---|---|
| Raw material composition (wt %) | | | | | | |
| Composition of first layer (outermost layer) | | | | | | |
| Crystalline polylactic acid (a1) |  |  | 54 |  | 50 |  |
| Crystalline polylactic acid (a2) | 81 | 81 | 16 | 78 |  | 78 |
| Crystalline polylactic acid (a3) |  |  | 10 |  | 29 |  |
| Cornpol CP-3 | 15 | 15 | 14 | 16 | 13 | 16 |
| ATBC | 4 | 4 | 6 | 6 | 8 | 6 |
| Total | 100 | 100 | 100 | 100 | 100 | 100 |
| Silicone resin (KMP-590) |  | 2 | 1 |  | 3 |  |
| Tg (° C.) of Cornpol | 130 | 130 | 128 | 128 | 128 | 128 |
| Composition of second layer (intermediate layer) | | | | | | |
| Crystalline polylactic acid (a2) |  | 75 |  |  | 75 |  |
| BIONOLLE #3001 |  |  | 100 |  | 25 |  |
| Ecoflex | 100 | 25 |  | 100 |  | 100 |
| Total | 100 | 100 | 100 | 100 | 100 | 100 |
| Composition of third layer (innermost layer) | | | | | | |
| BIONOLLE #3001 |  |  |  |  | 100 | None |
| Ecoflex |  | 100 |  |  |  |  |
| Suntec LD F1920 | 100 |  | 100 | 100 |  |  |
| Thickness of each layer (μm) | | | | | | |
| First layer | 5 | 4 | 5 | 5 | 5 | 5 |
| Second layer | 5 | 4 | 5 | 5 | 4 | 5 |
| Third layer | 10 | 4 | 5 | 5 | 4 | 0 |
| Total | 20 | 12 | 15 | 15 | 13 | 10 |
| Surface gloss (gloss: %) | 4 | 4 | 5 | 4 | 5 | 4 |
| Matte properties | aa | aa | aa | aa | aa | aa |
| Film-forming stability | aa | aa | aa | aa | aa | x |
| Roughness transferability and adhesiveness | aa | aa | aa | aa | aa | aa |
| Blocking | aa | aa | aa | aa | aa | aa |
| Overall assessment | AA | AA | AA | AA | AA | x |

TABLE 10

| | Example No. | | | | |
|---|---|---|---|---|---|
| | A52 | A53 | A54 | A55 | A56 |
| Antifouling property test | | | | | |
| Coffee | Grade 5 | Grade 5 | Grade 5 | Grade 5 | Grade 5 |
| Crayon | Grade 4 | Grade 5 | Grade 5 | Grade 4 | Grade 5 |
| Soy sauce | Grade 5 | Grade 5 | Grade 5 | Grade 5 | Grade 5 |
| Paint stick | Grade 5 | Grade 5 | Grade 5 | Grade 5 | Grade 5 |

Second, examples of a matte film consisting of a polylactic acid resin, starch and a plasticizer of the present invention will be now described.

A polylactic acid resin used in the following examples and Comparative Examples were crystalline polylactic acid (a1) and (a2) and amorphous polylactic acid (a3), which were prepared by polymerizing a monomer while controlling an amount of a catalyst, a polymerization condition and a composition of the monomer according to a method described in JP-A-4-504731, and had a weight average molecular weight, optical purity, Tg and Tm shown in Table 11. In addition, a used starch (E) includes corn starch made by Nihon Cornstarch Corporation, and wheat starch "Hamanoyuki (trade name)" made by Shin-Shin Foods Co., Ltd. In addition, a used plasticizer (C) includes glycerin made by Sakamoto Yakuhin Kogyo Co., Ltd., as an aliphatic polyhydric alcohol; ATBC (acetyl tributyl citrate) made by Nissei Chemical Industry Co., Ltd., as a polyhydroxycarboxylic acid ester and Rikemal PL-019 (trade names) made by Riken Vitamin Corporation, as glycerin acetic acid fatty acid ester; and silicone resin particles KMP-590 (trade name, average particle size: 1.5 μm) made by Shin-Etsu Chemical Co., Ltd., as a particulate polymer (D). In addition, Suntech LD F-1920 made by Asahi Kasei Chemicals Corporation was used as a nonadhesive resin. However, a composition of the resin of the present invention is not limited by them.

EXAMPLES B1 TO B8 AND COMPARATIVE EXAMPLES B1 TO B4

In Examples B1 to B8 and Comparative Examples B1 to B4, raw pellets were prepared by using crystalline polylactic acid (a1) and (a2), and amorphous polylactic acid (a3); corn starch and wheat starch as a starch (E); glycerin, ATBC and Rikemal PL-019 as a plasticizer (C); and a particulate polymer (D), which are all shown in Table 11: and by compounding them in such a way as will be described below. Specifically, the compound pellet of polylactic acid was prepared by melt extruding the polylactic acid (A), the starch (E), the plasticizer (C) and the particulate polymer (D) in a co-rotating twin-screw extruder so as to form a composition shown in Table 12.

Subsequently, films were formed by melting and extruding thus obtained compound pellets of polylactic acid through a circular single-layer die.

When the pellet was extruded, it was formed into a film by the steps of: extruding the pellet into a tubular form of a melt resin, with the use of a circular die having an outside die lip with the diameter of 110 millimeters, an inside die lip with the diameter of 108 millimeters and the lip clearance of 1.0 millimeter, and having a die temperature set at 160° C.; and introducing air into the tube while cooling the tube with the air of about 25° C. from a cooling ring, to form bubbles therein; guiding the obtained film to a pinch roll; and winding up the film in the tube form as the two flat films. The film with a final thickness of 15 μm was formed by subsequently fine-tuning a resin-extruded rate, a quantity of air injected into the bubbles and a film-winding rate by the pinch roll, after the bubbles became stable.

Evaluation results for physical properties of films formed in Examples B1 to B8 and Comparative Examples B1 to B4 are shown in Table 12.

EXAMPLES B9 TO B13 AND COMPARATIVE EXAMPLE B5

Multilayer films with predetermined thicknesses were formed by the steps of: employing compound pellets of polylactic acid obtained by being melt and blended with the use of a co-rotating twin screw extruder in the same method as in Examples B1 to B8 so as to form a composition shown in Table 13, for the first layer (outermost layer of tube film) in Examples B9 to B13; employing such a dry-blend of polylactic acid and BIONOLLE #3001 or Ecoflex, or each single material as to form the composition shown in Table 13, for the second layer (intermediate layer) in Examples B9 to B13; employing the same polylactic resin compound as the first layer in Example B9, Ecoflex in Example B10, Suntech LD F-1920 of low-density polyethylene which is a nonadhesive resin, for a resin in the second layer of Examples B11 and B12, and BIONOLLE #3001 in Example B13, for the third layer (innermost layer of tube film); and extruding them by using a three-layer circular die having an outside die lip with the diameter of 110 millimeters, an inside die lip with the diameter of 108 millimeters and the lip clearance of 1.0 millimeter, and having a die temperature set at 160° C.

However, the objective films in Examples B11 and B12 were obtained by peeling off the low-density polyethylene layer of the nonadhesive resin layer from the other two layers, after the three-layer films were formed, and the physical properties were evaluated on them. In addition, in Comparative Example B5, a film consisting of two layers and two compositions with a thickness of 10 μm was tried to be formed, so as to directly obtain a film with the same composition, the same film structure and the same thickness as those of the film obtained by having had removed a nonadhesive resin layer from the three-layer film of Example B11, by the steps of: preparing a raw material of the first layer and the second layer so as to form a composition shown in Table 13 in the same method as in Examples B9 to B13; and extruding them by using a two-layer circular die having an outside die lip with the diameter of 110 millimeters, an inside die lip with the diameter of 108 millimeters and the lip clearance of 1.0 millimeter, and having a die temperature set at 160° C.: but a continuous film was not obtained because film-forming stability deteriorated, and a fragmentally formed film was subjected to the evaluation for physical properties.

Evaluation results for physical properties of thus obtained films are shown in Table 13. In the table, the value of gloss (%) is a value of surface gloss (%) measured on the first layer side; the matte properties was evaluated also on the first layer side; and roughness transferability and adhesiveness were evaluated on a sample prepared by bringing a wall paper made from a polyvinyl chloride resin into close contact with third layer sides of Examples B9, B10 and B13, and with second layer sides of Examples B11 and B12 and Comparative Example B5; and thermo-compression-bonding them so that the first layer side appeared to the outside.

Table 14 shows the result of antifouling tests on films obtained in Examples B1 to B13. Among the results, the antifouling test in Examples B9 to B13 was carried out on the surface of the first layer side. It is understood that the film of the present invention is superior in antifouling properties as well. In addition, it is understood that the film containing a particulate polymer of a silicon resin in Examples B1, B2, B6, B8, B10 and B11 is further superior in the antifouling properties.

Third, examples of a matte film consisting of a polylactic acid resin and a particulate polymer of the present invention will be now described.

A polylactic acid resin used in the following examples and Comparative Examples were crystalline polylactic acid (a1) and (a2) and amorphous polylactic acid (a3), which were prepared by polymerizing a monomer while controlling an amount of a catalyst, a polymerization condition and a composition of the monomer according to a method described in JP-A-4-504731, and had a weight average molecular weight, optical purity, Tg and Tm shown in Table 15. In addition, the used particulate polymer (D) includes KMP-590 (trade name) of a silicone resin particle made by Shin-Etsu Chemical Co., Ltd., Lubron L-2 (trade name) of a PTFE (polytetrafluoroethylene) resin particle made by Daikin Industries, Ltd., and Epostar S-12 (trade name) of melamine resin particles made by Nippon Shokubai Co., Ltd. In addition, the used plasticizer (C) includes ATBC (trade name of acetyl tributyl citrate) made by Nissei Chemical Industry Co., Ltd., as a polyhydroxycarboxylic acid ester, and Rikemal PL-019 (trade name) made by Riken Vitamin Corporation, as glycerin acetic ester. In addition, Suntech LD F-1920 made by Asahi Kasei Chemicals Corporation was used as a nonadhesive resin. However, a composition of the resin of the present invention is not limited by those.

EXAMPLES C1 TO C9 AND COMPARATIVE EXAMPLES C1 TO C2

In Examples C1 to C9 and Comparative Examples C1 to C2, raw pellets were prepared by using crystalline polylactic acid (a1) and (a2), and amorphous polylactic acid (a3); a silicone resin particle (KMP-590), PTFE resin particles (Lubron L-2) and melamine resin particles (Epostar S-12), as a particulate polymer (D); and ATBC and Rikemal PL-019 as a plasticizer (C), which are all shown in Table 15: and by compounding them in such a way as will be described below. Specifically, the compound pellet of polylactic acid was prepared by melting and blending the polylactic acid (A), the particulate polymer (D) and the plasticizer (C) in a co-rotating twin-screw extruder so as to form a composition shown in Table 16.

Subsequently, films were formed by melting and extruding thus obtained compound pellets of polylactic acid through a circular single-layer die.

When the pellet was extruded, it was formed into a film by the steps of: extruding the pellet into a tubular form of a melt resin, with the use of a circular die having an outside die lip with the diameter of 110 millimeters, an inside die lip with the diameter of 108 millimeters and the lip clearance of 1.0 millimeter; and introducing air into the tube while cooling the tube with the air of about 25° C. from a cooling ring, to form bubbles therein; guiding the obtained film to a pinch roll; and winding up the film in the tube form as the two flat films. The film with a final thickness of 15 μm was formed by subsequently fine-tuning a resin-extruded rate, a quantity of air injected into the bubbles and a film-winding rate by the pinch roll, after the bubbles became stable.

Evaluation results for physical properties of films formed in Examples C1 to C9 and Comparative Examples C1 to C2 are shown in Table 16.

EXAMPLES C10 TO C14 AND COMPARATIVE EXAMPLE C3

Multilayer films with predetermined thicknesses were formed by the steps of: employing compound pellets of polylactic acid obtained by being melt and blended with the use of a co-rotating twin screw extruder in the same method as in Examples C1 to C9 so as to form a composition shown in Table 17, for the first layer (outermost layer of tube film) of Examples C10 to C14; employing such a dry-blend of polylactic acid and BIONOLLE #3001 or Ecoflex, or each single material of BIONOLLE #3001 or Ecoflex as to form the composition shown in Table 17, for the second layer (intermediate layer) of Examples C10 to C14; employing Suntech LD F-1920 of low-density polyethylene which is a nonadhesive resin, for a resin in the second layer of Examples C10, C13 and C14, Ecoflex in Example C11, and the same compound pellet of a polylactic resin as the first layer in Example C12, for the third layer (innermost layer of tube film); and extruding them by using a three-layer circular die having an outside die lip with the diameter of 110 millimeters, an inside die lip with the diameter of 108 millimeters and the lip clearance of 1.0 millimeter. After that, the objective films in Examples C10, C13 and C14 were obtained by peeling off the low-density polyethylene layer of the nonadhesive resin layer from the other two layers, after the three-layer films were formed, and the physical properties were evaluated on them. In addition, in Comparative Example C3, a film consisting of two layers and two compositions with the thickness of 10 μm was tried to be formed, so as to directly obtain a film with the same composition, the same film structure and the same thickness as those of the film obtained by having had removed a nonadhesive resin layer from the three-layer film of Example C10, by the steps of: preparing a raw material of the first layer and the second layer so as to form a composition shown in Table 17 in the same method as in Examples C10 to C14; and extruding them by using a two-layer circular die having an outside die lip with the diameter of 110 millimeters, an inside die lip with the diameter of 108 millimeters and the lip clearance of 1.0 millimeter: but a continuous film was not obtained because film-forming stability deteriorated, and a fragmentally formed film was subjected to the evaluation for physical properties.

Evaluation results for physical properties of thus obtained films are shown in Table 17. In the table, the value of gloss (%) is a value of surface gloss (%) measured on the first layer side; the matte properties was evaluated also on the first layer side; and roughness transferability and adhesiveness were evaluated on a sample prepared by bringing a wall paper made from a polyvinyl chloride resin into close contact with second layer sides of Examples C10, C13 and C14 and Comparative Example C3, and with third layer sides of Examples C11 and C12; and thermo-compression-bonding them so that the first layer side appeared to the outside.

Table 18 shows the result of antifouling tests on films obtained in Examples C1 to C14. Among the results, the antifouling test in Examples C10 to C14 was carried out on the surface of the first layer side. It is understood that the film of the present invention is superior in antifouling properties as well.

Fourth, examples of a matte film consisting of a polylactic acid resin and an inorganic filler of the present invention will be now described.

A polylactic acid resin used in the following examples and Comparative Examples were crystalline polylactic acid (a1) and (a2) and amorphous polylactic acid (a3), which were prepared by polymerizing a monomer while controlling an amount of a catalyst, a polymerization condition and a composition of the monomer according to a method described in JP-A-4-504731, and had a weight average molecular weight, optical purity, Tg and Tm shown in Table 19. In addition, the used inorganic filler (F) was Collocalso-EX (trade name) of calcium carbonate made by Shiraishi Calcium Kaisha, Hi-filler #12 (trade name) of talc made by Matsumurasangyo Co., Ltd., and Sipernat FK310 (trade name) of silica made by Degussa Japan Co., Ltd. In addition, the used plasticizer (C) was ATBC (trade name of acetyl tributyl citrate) made by Nissei Chemical Industry Co., Ltd. for a polyhydroxycarboxylic acid ester, and Rikemal PL-019 (trade name) made by Riken Vitamin Corporation, for glycerin acetic acid ester; and KMP-590 (trade name) of silicone resin particles made by Shin-Etsu Chemical Co., Ltd., for a particulate polymer (D). In addition, Suntech LD F-1920 made by Asahi Kasei Chemicals Corporation was used as a nonadhesive resin. However, a composition of the resin of the present invention is not limited by those.

EXAMPLES D1 TO D9 AND COMPARATIVE EXAMPLES D1 TO D2

In Examples D1 to D9 and Comparative Examples D1 to D2, raw pellets were prepared by using crystalline polylactic acid (a1) and (a2), and amorphous polylactic acid (a3); calcium carbonate (Collocalso-EX), talc (Hi-filler #12) and silica (Sipernat FK310), as an inorganic filler (F); ATBC and Rikemal PL-019 as a plasticizer (C); and a silicon resin particle (KMP-590) as a particulate polymer (D), which are all shown in Table 19: and by compounding them in such a way as will be described below. Specifically, the compound pellet of polylactic acid was prepared by melting and blending the polylactic acid (A), the inorganic filler (F), the plasticizer (C) and the particulate polymer (D) so as to form a composition in a co-rotating twin screw extruder shown in Table 20.

Subsequently, films were formed by melting and extruding thus obtained compound pellets of polylactic acid through a circular single-layer die.

When the pellet was extruded, it was formed into a film by the steps of: extruding the pellet into a tubular form of a melt resin, with the use of a circular die having an outside die lip with the diameter of 110 millimeters, an inside die lip with the diameter of 108 millimeters and the lip clearance of 1.0 millimeter; and introducing air into the tube while cooling the tube with the air of about 25° C. from a cooling ring, to form bubbles therein; guiding the obtained film to a pinch roll; and winding up the film in the tube form as the two flat films. The film with a final thickness of 15 μm was formed by subsequently fine-tuning a resin-extruded rate, a quantity of air injected into the bubbles and a film-winding rate by the pinch roll, after the bubbles became stable.

Evaluation results for physical properties of films formed in Examples D1 to D9 and Comparative Examples D1 to D2 are shown in Table 20.

EXAMPLES D10 TO D14 AND COMPARATIVE EXAMPLES D3

Multilayer films with predetermined thicknesses were formed by the steps of: employing compound pellets of polylactic acid obtained by being melt and blended with the use of a co-rotating twin screw extruder in the same method as in Examples D1 to D9 so as to form a composition shown in Table 21, for the first layer (outermost layer of tube film) of Examples D10 to D14; employing such a dry-blend of polylactic acid and BIONOLLE #3001 or Ecoflex, or each single material of BIONOLLE #3001 or Ecoflex as to form the composition shown in Table 21, for the second layer (intermediate layer) of Examples D10 to D14; employing Suntech LD F-1920 of low-density polyethylene which is a nonadhesive resin, for a resin in the second layer of Examples D10, D13 and D14, Ecoflex in Example D11, and the same compound pellet of the polylactic resin as the first layer in Example D12, for the third layer (innermost layer of tube film); and extruding them by using a three-layer circular die having an outside die lip with the diameter of 110 millimeters, an inside die lip with the diameter of 108 millimeters and the lip clearance of 1.0 millimeter. After that, the objective films in Examples D10, D13 and D14 were obtained by peeling off the low-density polyethylene layer of the nonadhesive resin layer from the other two layers, after the three-layer films were formed, and the physical properties were evaluated on them. In addition, in Comparative Example D3, a film consisting of two layers and two compositions with the thickness of 10 μm was tried to be formed, so as to directly obtain a film with the same composition, the same film structure and the same thickness as those of the film obtained by having had removed a nonadhesive resin layer from the three-layer film of Example D10, by the steps of: preparing a raw material of the first layer and the second layer so as to form a composition shown in Table 21 in the same method as in Examples D10 to D14; and extruding them by using a two-layer circular die having an outside die lip with the diameter of 110 millimeters, an inside die lip with the diameter of 108 millimeters and the lip clearance of 1.0 millimeter: but a continuous film was not obtained because film-forming stability deteriorated, and a fragmentally formed film was subjected to the evaluation for physical properties.

Evaluation results for physical properties of thus obtained films are shown in Table 21. In the table, the value of gloss (%) is a value of surface gloss (%) measured on the first layer side; the matte properties was evaluated also on the first layer side; and roughness transferability and adhesiveness were evaluated on a sample prepared by bringing a wall paper made from a polyvinyl chloride resin into close contact with second layer sides of Examples D10, D13 and D14 and Comparative Example D3, and with third layer sides of Examples D11 and D12; and thermo-compression-bonding them so that the first layer side appeared to the outside.

Table 22 shows the result of antifouling tests on films obtained in Examples D1 to D14. Among the results, the antifouling test in Examples D10 to D14 was carried out on the surface of the first layer side. It is understood that the film of the present invention is superior in antifouling properties as well. In addition, it is understood that the film containing a particulate polymer (D) of a silicon resin in Examples D1, D3, D5, D7, D9, D11 and D13 is further superior in the antifouling properties.

TABLE 11

| | Weight average molecular weight | D-lactic acid content | Optical purity | Tg | Tm | Remarks |
|---|---|---|---|---|---|---|
| Polylactic acid resin (A) | | | | | | |
| Crystalline polylactic acid (a1) | 210,000 | 1.3% | 97% | 58° C. | 174° C. | |
| Crystalline polylactic acid (a2) | 220,000 | 4.1% | 92% | 55° C. | 160° C. | |
| Crystalline polylactic acid (a3) | 230,000 | 13.2% | 74% | 54° C. | None | |
| Starch (E) | | | | | | |
| Corn starch | | | | | | Product of Nihon Cornstarch Corporation |
| Wheat starch | | | | | | Shin-Shin Foods Co., Ltd. |
| Plasticizer (C) | | | | | | |
| Glycerin | | | | | | Sakamoto Yakuhin Kogyo Co., Ltd. |
| ATBC (acetyl tributyl citrate) | | | | | | Product of Nissei Chemical Industry Co., Ltd. |
| PL-019 (glycerin diacetomonocaprate) | | | | | | Product of Riken Vitamin Co., Ltd. |
| Particulate polymer (D) | | | | | | |
| Silicone resin (KMP-590) | | | | | | Product of Shin-Etsu Chemical Co., Ltd. |
| Resin for second layer of multilayer film | | | | | | |
| BIONOLLE #3001 (Polybutylene succinate adipate) | | | | −45° C. | 95° C. | Product of Showa Highpolymer Co., Ltd. |
| Ecoflex (Biodegradable aliphatic-aromatic copolyester) | | | | −30° C. | 110° C. | Product of BASF AG |
| Nonadhesive resin | | | | | | |
| Suntec LD F-1920 (low density polyethylene) | | | | | | Product of Asahi Kasei Chemicals Corporation |

TABLE 12

| | Example B1 | Example B2 | Example B3 | Example B4 | Example B5 | Example B6 | Example B7 | Example B8 | Comparative Example B1 | Comparative Example B2 | Comparative Example B3 | Comparative Example B4 |
|---|---|---|---|---|---|---|---|---|---|---|---|---|
| Raw material composition (wt %) | | | | | | | | | | | | |
| Crystalline polylactic acid (a1) | | | 40 | | 87 | | | 79 | 68 | | | 52 |
| Crystalline polylactic acid (a2) | 79 | 76 | | 83.5 | | 66 | 89 | | | 73 | 90 | |
| Crystalline polylactic acid (a3) | | | 28 | | | | | | 23 | | | |
| Corn starch | 13 | 18 | 23 | | | 30 | | 8 | 1 | 9 | 10 | 45 |
| Wheat starch | | | | 13 | 5 | | 3 | | | | | |
| Wheat starch | 4 | 3 | 6 | 1.5 | 2 | 2 | 2 | 4 | 1 | 5 | | 3 |
| ATBC | 4 | 3 | 3 | | 6 | 2 | 6 | 9 | 7 | 13 | | |
| PL-019 | | | | 2 | | | | | | | | |
| Total | 100 | 100 | 100 | 100 | 100 | 100 | 100 | 100 | 100 | 100 | 100 | 100 |
| Silicone resin (KMP-590) | 1 | 2 | | | | 4 | | 2 | | | | |
| Surface gloss (gloss: %) | 7 | 5 | 4 | 8 | 25 | 4 | 35 | 17 | 66 | 17 | 40 | 6 |
| Matte properties | aa | aa | aa | aa | b | aa | c | a | x | a | c | aa |
| Film-forming stability | aa | aa | aa | aa | aa | b | aa | aa | aa | aa | c | x |
| Roughness transferability and adhesiveness | aa | aa | aa | a | aa | b | aa | aa | aa | aa | x | x |
| Blocking | aa | aa | aa | aa | aa | aa | aa | c | aa | x | aa | aa |
| Overall assessment | AA | AA | AA | A | B | B | C | C | x | x | x | x |

TABLE 13

| | Example B9 | Example B10 | Example B11 | Example B12 | Example B13 | Comparative Example B5 |
|---|---|---|---|---|---|---|
| Raw material composition (wt %) Composition of first layer (outermost layer) | | | | | | |
| Crystalline polylactic acid (a1) | | | | 40 | 87 | |
| Crystalline polylactic acid (a2) | 79 | 76 | 79 | | | 79 |
| Crystalline polylactic acid (a3) | | | | 28 | | |
| Corn starch | 13 | 18 | 13 | 23 | 5 | 13 |
| Wheat starch | 4 | 3 | 4 | 6 | 2 | 4 |
| ATBC | 4 | 3 | 4 | 3 | 6 | 4 |
| Total | 100 | 100 | 100 | 100 | 100 | 100 |
| Silicone resin (KMP-590) | | 2 | 1 | | | 1 |
| Composition of second layer (intermediate layer) | | | | | | |
| Crystalline polylactic acid (a1) | | | | | | |
| Crystalline polylactic acid (a2) | 75 | 75 | | | 75 | |
| Crystalline polylactic acid (a3) | | | | | | |
| BIONOLLE #3001 | | | | 100 | 25 | |
| Ecoflex | 25 | 25 | 100 | | | 100 |
| Total | 100 | 100 | 100 | 100 | 100 | 100 |
| Composition of third layer (innermost layer) | | | | | | |
| Crystalline polylactic acid (a1) | Same as first layer | | | | | None |
| Crystalline polylactic acid (a2) | | | | | | |
| Crystalline polylactic acid (a3) | | | | | | |
| BIONOLLE #3001 | | | | | 100 | |
| Ecoflex | | 100 | | | | |
| Suntec LD F1920 | | | 100 | 100 | | |
| Total | | 100 | 100 | 100 | 100 | |

TABLE 13-continued

|  | Example B9 | Example B10 | Example B11 | Example B12 | Example B13 | Comparative Example B5 |
|---|---|---|---|---|---|---|
| Thickness of each layer (μm) | | | | | | |
| First layer | 5 | 4 | 5 | 5 | 6 | 5 |
| Second layer | 5 | 4 | 5 | 5 | 5 | 5 |
| Third layer | 5 | 4 | 5 | 5 | 4 | 0 |
| Total | 15 | 12 | 15 | 15 | 15 | 10 |
| Surface gloss (gloss: %) | 7 | 5 | 7 | 4 | 25 | 7 |
| Matte properties | aa | aa | aa | aa | b | aa |
| Film-forming stability | aa | aa | aa | aa | aa | x |
| Roughness transferability and adhesiveness | aa | aa | aa | aa | aa | aa |
| Blocking | aa | aa | aa | aa | aa | aa |
| Overall assessment | AA | AA | AA | AA | B | x |

TABLE 14

| Example No. | B1 | B2 | B3 | B4 | B5 | B6 | B7 | B8 | B9 | B10 | B11 | B12 | B13 |
|---|---|---|---|---|---|---|---|---|---|---|---|---|---|
| Antifouling property test | | | | | | | | | | | | | |
| Coffee | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Crayon | Grade 5 | Grade 5 | Grade 4 | Grade 4 | Grade 4 | Grade 5 | Grade 4 | Grade 5 | Grade 4 | Grade 5 | Grade 5 | Grade 4 | Grade 4 |
| Soy sauce | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Paint stick | Grade 5 | Grade 5 | Grade 4 | Grade 4 | Grade 5 | Grade 5 | Grade 5 | Grade 5 | Grade 4 | Grade 5 | Grade 5 | Grade 4 | Grade 5 |

TABLE 15

|  | Weight average molecular weight | D-lactic acid content | Optical purity | Tg | Tm | Remarks |
|---|---|---|---|---|---|---|
| Polylactic acid resin (A) | | | | | | |
| Crystalline polylactic acid (a1) | 240,000 | 1.3% | 97% | 58° C. | 173° C. | |
| Crystalline polylactic acid (a2) | 220,000 | 3.9% | 92% | 55° C. | 162° C. | |
| Crystalline polylactic acid (a3) | 230,000 | 12.9% | 74% | 54° C. | None | |
| Resin for second layer of multilayer film | | | | | | |
| BIONOLLE #3001 (Polybutylene succinate adipate) | | | | −45° C. | 95° C. | Product of Showa Highpolymer Co., Ltd. |
| Ecoflex (Biodegradable aliphatic-aromatic copolyester) | | | | −30° C. | 110° C. | Product of BASF AG |
| Nonadhesive resin | | | | | | |
| Suntec LD F-1920 (low density polyethylene) | | | | | | Product of Asahi Kasei Chemicals Co., Ltd. |
| Plasticizer (C) | | | | | | |
| ATBC (acetyl tributyl citrate) | | | | | | Product of Nissei Chemical Industry Co., Ltd. |
| PL-019 (glycerin diacetomonocaprate) | | | | | | Product of Riken Vitamin Co., Ltd. |

|  | Average particle size | D-lactic acid content | Optical purity | Tg | Tm | Remarks |
|---|---|---|---|---|---|---|
| Particulate polymer (D) | | | | | | |
| KMP-590 (Silicone resin) | 1.5 μm | | | | | Product of Shin-Etsu Chemical Co., Ltd. |
| Lubron L-2 (PTFE resin) | 5.0 μm | | | | | Product of Daikin Industries, Ltd. |
| Epostar S12 (melamine resin) | 1.2 μm | | | | | Product of Nippon Shokubai Co., Ltd. |

TABLE 16

| | Example C1 | Example C2 | Example C3 | Example C4 | Example C5 | Example C6 | Example C7 | Example C8 | Example C9 | Comparative Example C1 | Comparative Example C2 |
|---|---|---|---|---|---|---|---|---|---|---|---|
| Raw material composition (wt %) | | | | | | | | | | | |
| Crystalline polylactic acid (a1) | | | | 50 | 80 | | | | | | 80 |
| Crystalline polylactic acid (a2) | 80 | 85 | 83 | | | 60 | 75 | 88 | 67 | 65 | |
| Crystalline polylactic acid (a3) | | | | 25 | 9 | 13 | | | | | 12 |
| KMP-590 | 16 | 12 | | | | 23 | | | 29 | 33 | |
| Lubron L-2 | | | 9 | | | | 12 | | | | |
| Epostar S12 | | | | 19 | 6 | | | 4 | | | |
| ATBC | 4 | | 6 | 5 | 4 | | | 8 | 4 | 2 | |
| PL-019 | | 3 | 8 | | | 13 | | | | | 8 |
| Total | 100 | 100 | 100 | 100 | 100 | 100 | 100 | 100 | 100 | 100 | 100 |
| Surface gloss (gloss: %) | 6 | 7 | 8 | 4 | 15 | 3 | 8 | 28 | 3 | 3 | 110 |
| Matte properties | aa | aa | aa | aa | a | aa | aa | b | aa | aa | x |
| Film-forming stability | aa | aa | aa | aa | aa | b | aa | aa | c | x | aa |
| Roughness transferability and adhesiveness | aa | aa | aa | aa | aa | b | aa | aa | c | c | aa |
| Blocking | aa | aa | aa | aa | aa | aa | c | aa | aa | aa | aa |
| Overall assessment | AA | AA | AA | AA | A | B | C | B | C | x | x |

TABLE 17

| | Example C10 | Example C11 | Example C12 | Example C13 | Example C14 | Comparative Example C3 |
|---|---|---|---|---|---|---|
| Raw material composition (wt %) | | | | | | |
| Composition of first layer (outermost layer) | | | | | | |
| Crystalline polylactic acid (a1) | | | | 70 | | |
| Crystalline polylactic acid (a2) | 80 | 85 | 83 | | 90 | 80 |
| Crystalline polylactic acid (a3) | | | | 15 | | |
| KMP-590 | 16 | 12 | | 15 | | 16 |
| Lubron L-2 | | | | | 10 | |
| Epostar S12 | | | 9 | | | |
| ATBC | 4 | | 8 | | | 4 |
| PL-019 | | 3 | | | | |
| Total | 100 | 100 | 100 | 100 | 100 | 100 |
| Composition of second layer (intermediate layer) | | | | | | |
| Crystalline polylactic acid (a1) | | | | | | |
| Crystalline polylactic acid (a2) | | 75 | 75 | | | |
| Crystalline polylactic acid (a3) | | | | | | |
| BIONOLLE #3001 | | | | 100 | | |
| Ecoflex | 100 | 25 | 25 | | 100 | 100 |
| Total | 100 | 100 | 100 | 100 | 100 | 100 |
| Composition of third layer (innermost layer) | | | | | | |
| Ecoflex | | 100 | Same as first layer | | | None |
| Suntec LD F-1920 | 100 | | | 100 | 100 | |
| Total | 100 | 100 | | 100 | 100 | |
| Thickness of each layer (μm) | | | | | | |
| First layer | 5 | 5 | 6 | 5 | 5 | 5 |
| Second layer | 5 | 4 | 4 | 5 | 5 | 5 |
| Third layer | 6 | 4 | 4 | 6 | 6 | 0 |
| Total | 16 | 13 | 14 | 16 | 16 | 10 |
| Surface gloss (gloss: %) | 6 | 7 | 8 | 5 | 7 | 6 |
| Matte properties | aa | aa | aa | aa | aa | aa |
| Film-forming stability | aa | aa | aa | aa | aa | x |
| Roughness transferability and adhesiveness | aa | aa | aa | aa | aa | aa |
| Blocking | aa | aa | aa | aa | aa | aa |
| Overall assessment | AA | AA | AA | AA | AA | x |

TABLE 18

| | Example No. | | | | | | | | | | | | | |
|---|---|---|---|---|---|---|---|---|---|---|---|---|---|---|
| | C1 | C2 | C3 | C4 | C5 | C6 | C7 | C8 | C9 | C10 | C11 | C12 | C13 | C14 |
| | Antifouling property test | | | | | | | | | | | | | |
| Coffee | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Crayon | Grade 5 | Grade 5 | Grade 5 | Grade 4 | Grade 4 | Grade 5 | Grade 5 | Grade 4 | Grade 5 | Grade 5 | Grade 5 | Grade 4 | Grade 5 | Grade 5 |
| Soy sauce | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Paint stick | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |

TABLE 19

| | Weight average molecular weight | D-lactic acid content | Optical purity | Tg | Tm | Remarks |
|---|---|---|---|---|---|---|
| | Polylactic acid resin (A) | | | | | |
| Crystalline polylactic acid (a1) | 220,000 | 1.2% | 97% | 57° C. | 175° C. | |
| Crystalline polylactic acid (a2) | 210,000 | 4.0% | 92% | 55° C. | 161° C. | |
| Crystalline polylactic acid (a3) | 220,000 | 13.1% | 74% | 54° C. | None | |
| | Resin for second layer of multilayer film | | | | | |
| BIONOLLE #3001 (Polybutylene succinate adipate) | | | | −45° C. | 95° C. | Product of Showa Highpolymer Co., Ltd. |
| Ecoflex (Biodegradable aliphatic-aromatic copolyester) | | | | −30° C. | 110° C. | Product of BASF AG |
| | Nonadhesive resin | | | | | |
| Suntec LD F-1920 (low density polyethylene) | | | | | | Product of Asahi Kasei Chemicals Corporation |
| | Plasticizer (C) | | | | | |
| ATBC (acetyl tributyl citrate) | | | | | | Product of Nissei Chemical Industry Co., Ltd. |
| PL-019 (glycerin diacetomonocaprate) | | | | | | Product of Riken Vitamin Co., Ltd. |

| | Average particle size | Hunter's brightness | Optical purity | Tg | Tm | Remarks |
|---|---|---|---|---|---|---|
| | Inorganic filler (F) | | | | | |
| Collocalso EX (calcium carbonate) | 7.0 μm | 94.5 or more | | | | Product of Shiraishi Calcium Kaisha, Ltd. |
| Hi-filler #12 (talc) | 3.0 μm | 92 or more | | | | Product of Matsumura Sangyo K.K. |
| Sipernat FK310 (silica) | 2.0 μm | — | | | | Product of Degussa Japan Co., Ltd. |
| | Particulate polymer (D) | | | | | |
| KMP-590 (Silicone resin) | 1.5 μm | | | | | Product of Shin-Etsu Chemical Co., Ltd. |

TABLE 20

| | Example D1 | Example D2 | Example D3 | Example D4 | Example D5 | Example D6 | Example D7 | Example D8 | Example D9 | Comparative Example D1 | Comparative Example D2 |
|---|---|---|---|---|---|---|---|---|---|---|---|
| | Raw material composition (wt %) | | | | | | | | | | |
| Crystalline polylactic acid (a1) | | | 60 | | | | | 80 | 58 | | |
| Crystalline polylactic acid (a2) | 81 | 86 | | 76 | 90 | 74 | 77 | | | 66 | 92 |
| Crystalline polylactic acid (a3) | | | 24 | | | | | 10 | 10 | | |
| Hi-filler #12 | | 11 | 8 | 18 | | 22 | | | | 28 | 32 |
| Collocalso EX | 15 | | | | | | 11 | 2 | | | |
| Sipernat | | | | | 5 | | | | | | |

TABLE 20-continued

|  | Example D1 | Example D2 | Example D3 | Example D4 | Example D5 | Example D6 | Example D7 | Example D8 | Example D9 | Comparative Example D1 | Comparative Example D2 |
|---|---|---|---|---|---|---|---|---|---|---|---|
| ATBC | 4 |  |  | 6 | 5 | 4 |  | 8 | 4 | 2 |  |
| PL-019 |  | 3 | 8 |  |  |  | 12 |  |  |  | 8 |
| Total | 100 | 100 | 100 | 100 | 100 | 100 | 100 | 100 | 100 | 100 | 100 |
| KMP-590 | 1 |  | 1 |  | 1 |  | 2 |  | 3 |  |  |
| Surface gloss (gloss: %) | 8 | 5 | 8 | 4 | 11 | 3 | 5 | 25 | 3 | 3 | 110 |
| Matte properties | aa | aa | aa | aa | a | aa | aa | b | aa | aa | x |
| Film-forming stability | aa | aa | aa | a | aa | b | aa | aa | c | x | aa |
| Roughness transferability and adhesiveness | aa | aa | aa | aa | aa | b | aa | aa | c | c | aa |
| Blocking | aa | aa | aa | aa | aa | aa | b | aa | aa | aa | aa |
| Overall assessment | AA | AA | AA | A | A | B | B | B | C | x | x |

TABLE 21

|  | Example D10 | Example D11 | Example D12 | Example D13 | Example D14 | Comparative Example D3 |
|---|---|---|---|---|---|---|
| Raw material composition (wt %) | | | | | | |
| Composition of first layer (outermost layer) | | | | | | |
| Crystalline polylactic acid (a1) |  |  |  | 70 |  |  |
| Crystalline polylactic acid (a2) | 81 | 86 | 84 |  | 91 | 81 |
| Crystalline polylactic acid (a3) |  |  |  | 16 |  |  |
| Hi-filler #12 |  | 11 | 5 | 14 | 9 |  |
| Collocalso EX | 15 |  |  |  |  | 15 |
| Sipernat |  |  | 3 |  |  |  |
| ATBC | 4 |  | 8 |  |  | 4 |
| PL-019 |  | 3 |  |  |  |  |
| Total | 100 | 100 | 100 | 100 | 100 | 100 |
| KMP-590 |  | 1 |  | 1 |  |  |
| Composition of second layer (intermediate layer) | | | | | | |
| Crystalline polylactic acid (a1) |  |  |  |  |  |  |
| Crystalline polylactic acid (a2) |  | 75 | 75 |  |  |  |
| Crystalline polylactic acid (a3) |  |  |  |  |  |  |
| BIONOLLE #3001 |  |  |  | 100 |  |  |
| Ecoflex | 100 | 25 | 25 |  | 100 | 100 |
| Total | 100 | 100 | 100 | 100 | 100 | 100 |
| Composition of third layer (innermost layer) | | | | | | |
| Ecoflex |  | 100 | Same as first layer |  |  | None |
| Suntec LD F-1920 | 100 |  |  | 100 | 100 |  |
| Total | 100 | 100 |  | 100 | 100 |  |
| Thickness of each layer (μm) | | | | | | |
| First layer | 5 | 5 | 6 | 5 | 5 | 5 |
| Second layer | 5 | 5 | 4 | 5 | 5 | 5 |
| Third layer | 8 | 5 | 5 | 8 | 8 | 0 |
| Total | 18 | 15 | 15 | 18 | 18 | 10 |
| Surface gloss (gloss: %) | 8 | 5 | 7 | 4 | 6 | 8 |
| Matte properties | aa | aa | aa | aa | aa | aa |
| Film-forming stability | aa | aa | aa | aa | aa | x |
| Roughness transferability and adhesiveness | aa | aa | aa | aa | aa | aa |
| Blocking | aa | aa | aa | aa | aa | aa |
| Overall assessment | AA | AA | AA | AA | AA | x |

TABLE 22

| | Example No. | | | | | | | | | | | | | |
|---|---|---|---|---|---|---|---|---|---|---|---|---|---|---|
| | D1 | D2 | D3 | D4 | D5 | D6 | D7 | D8 | D9 | D10 | D11 | D12 | D13 | D14 |
| | Antifouling property test | | | | | | | | | | | | | |
| Coffee | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Crayon | Grade 5 | Grade 4 | Grade 4 | Grade 4 | Grade 5 | Grade 4 | Grade 4 | Grade 4 | Grade 5 | Grade 4 | Grade 5 | Grade 4 | Grade 5 | Grade 4 |
| Soy sauce | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |
| Paint stick | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 | Grade 5 |

INDUSTRIAL APPLICABILITY

The matte film or sheet of the present invention is a single-layer or multilayer film or sheet having adequate film-forming stability and excellent matte properties consisting of: first, a polylactic acid resin (A), a chemically modified starch (B) and a plasticizer (C); second, the polylactic acid resin (A), a starch (E) and the plasticizer (C); third, the polylactic acid resin (A) and a particulate polymer (D); and fourth, the polylactic acid resin (A) and an inorganic filler (F). In addition, these films or sheets are singly used for a packaging material with a matte surface and an upscale image, and an agricultural material such as a cultivation house and a multilayered film; or used for films or sheets which impart an upscale and modest appearance with controlled gloss, and an antifouling property, to a wall paper, a screen, an interior decoration, a commodity, a school supply such as an envelope, a file case and a cover workpiece, a stationery and a notebook, in a state of being stacked on the surface of those materials; and can be suitably used for the film or sheet for a laminate, which imparts a matte surface and a quality appearance, and an appropriate water-proofing property, oil-proofing property and antifouling property, to a paper product, a paper container, a fabric product, a textile product, a tablecloth or the like, in a state of being stacked on the surface of those materials.

The invention claimed is:

1. A single-layer matte film or sheet comprising:
   55 to 97 wt % of a polylactic acid resin (A);
   2 to 30 wt % of chemically modified starch (B) particulates, the chemically modified starch (B) particulates being formed of a starch derivative mixture containing 40 wt % or more of at least one starch derivative (b) selected from the group consisting of starch ester, starch ether, and polyester graft polymer starch; and
   1 to 15 wt % of a plasticizer (C),
   wherein the film or sheet has a micro phase-separation structure in which the polylactic acid resin (A) forms a matrix and the chemically modified starch (B) particulates form a domain, and in a cross-section cut in the transverse direction of the film or sheet (referred to as TD cross-section), an average cross-sectional area of the 20% largest domains of the chemically modified starch (B) particulates is 20,000 nm$^2$ or larger, and
   at least one side of the film or sheet has a surface gloss of 60% or lower when measured in accordance with ASTM-D2457-70 (45° gloss).

2. The matte film or sheet according to claim 1, wherein the starch derivative (b) has a glass transition temperature Tg of 100 to 170° C.

3. The matte film or sheet according to claim 1, wherein the plasticizer (C) is an ester synthesized from a combination of two or more compounds selected from the group consisting of an aliphatic carboxylic acid having 7 or less carbon atoms, an aliphatic hydroxycarboxylic acid having 7 or less carbon atoms, and an aliphatic alcohol having 7 or less carbon atoms.

4. The matte film or sheet according to claim 1, further comprising 5 wt % or less of a particulate polymer (D) having an average particle size of 10 μm or smaller based on 100 wt % in total of the polylactic acid resin (A), the chemically modified starch (B) particulates, and the plasticizer (C).

5. A multilayered matte film or sheet comprising the matte film or sheet according to claim 1 stacked so that the surface having a surface gloss of 60% or less is at least one external surface.

6. Wall paper comprising:
   a wall paper base having a surface; and
   the matte film or sheet according to claim 1 stacked on the surface of the wall paper base.

* * * * *